US008759465B2

(12) United States Patent
Wilker et al.

(10) Patent No.: US 8,759,465 B2
(45) Date of Patent: Jun. 24, 2014

(54) CROSS-LINKABLE POLYMERIC COMPOSITIONS

(75) Inventors: Jonathan James Wilker, Wellesleym, MA (US); Glenn Westwood, Bethlehem, PA (US); Trinity Noel Horton, Mentor, OH (US)

(73) Assignee: Purdue Research Foundation, West Lafayette, IN (US)

(*) Notice: Subject to any disclaimer, the term of this patent is extended or adjusted under 35 U.S.C. 154(b) by 69 days.

(21) Appl. No.: 12/106,840

(22) Filed: Apr. 21, 2008

(65) Prior Publication Data

US 2009/0036611 A1 Feb. 5, 2009

Related U.S. Application Data

(63) Continuation-in-part of application No. PCT/US2007/009986, filed on Apr. 25, 2007.

(60) Provisional application No. 60/795,021, filed on Apr. 25, 2006, provisional application No. 60/925,589, filed on Apr. 20, 2007, provisional application No. 60/926,145, filed on Apr. 25, 2007.

(51) Int. Cl.
C08F 212/08 (2006.01)
C08F 212/14 (2006.01)

(52) U.S. Cl.
USPC ..... 526/347; 526/313; 526/347.1; 525/328.8; 525/328.5; 525/333.3; 525/333.5; 525/60; 525/370

(58) Field of Classification Search
USPC ............. 525/328.8, 328.5, 333.5, 333.3, 360, 525/370
See application file for complete search history.

(56) References Cited

U.S. PATENT DOCUMENTS

| | | | | | |
|---|---|---|---|---|---|
| 3,582,386 | A | * | 6/1971 | Yankopoulos | 428/142 |
| 3,959,568 | A | * | 5/1976 | Hill, Jr. et al. | 428/462 |
| 4,565,846 | A | * | 1/1986 | Saito et al. | 525/101 |
| 4,629,663 | A | * | 12/1986 | Brown et al. | 428/343 |
| 4,880,487 | A | * | 11/1989 | Sheehan et al. | 156/327 |
| 5,324,804 | A | * | 6/1994 | Steinmann | 526/313 |
| 5,763,560 | A | * | 6/1998 | Tsujimoto et al. | 528/234 |
| 5,800,974 | A | * | 9/1998 | Wallis et al. | 430/566 |
| 5,844,057 | A | * | 12/1998 | Watanabe et al. | 526/313 |
| 2005/0154137 | A1 | * | 7/2005 | Husemann et al. | 525/205 |
| 2005/0288398 | A1 | | 12/2005 | Messersmith et al. | |

FOREIGN PATENT DOCUMENTS

GB 1460400 * 1/1975

OTHER PUBLICATIONS

Yang et al., the Synthesis of poly(3,4-dihydroxystyrene) and poly[(sodium 4-styrenesuflonate)-co-(3,4-dihydroxystyrene)], Macromol. Rapid Commun. 19, 241-246 (1998).*
Tetsuya et al., Patent Abstracts of Japan Publication No. 61-233002.*
International Search Report, PCT/US2007/009986, Dec. 19, 2007.
International Preliminary Report on Patentability, PCT/US2007/009986, Oct. 28, 2008.
Daly et al., "Synthesis of poly (vinylcatechols)", Journal of Polymer Science: Polymer Symposium, vol. 74, 1986, pp. 227-242, XP008086907.
Xiang et al., "A novel synthesis of linear high-molecular-weight poly (4-vinylphenol) and poly[styrene-co-(4-vinylphenol)]", Macromol. Rapid Commun., vol. 16, 1995, pp. 477-481, XP00808619.
Mohanan et al., "Cross-linking the protein precursor of marine mussel adhesives: bulk measurements and reagents for curing", Langmuir, vol. 20, 2004, pp. 3724-3729, XP008086906.

* cited by examiner

*Primary Examiner* — Robert C Boyle
(74) *Attorney, Agent, or Firm* — Brinks Gilson & Lione

(57) ABSTRACT

A class of bioinspired, cross linking polymers, created by working catechol functionalities into the backbone of a bulk polymer, is disclosed. Varied cross linking groups may be incorporated into different polymer backbones, and subsequently reacted with an array of reagents. An adhesive composition comprising a copolymer, the copolymer comprising pendant dihydroxyphenyl groups; and a crosslinking agent selected from the group consisting of, for example, oxidants, enzymes, metals, and light. A method of preparing an adhesive composition comprising copolymerizing a first monomer comprising pendant dihydroxy-protected dihydroxyphenyl groups; deprotecting the dihydroxy-protected dihydroxyphenyl groups; crosslinking the dihydroxyphenyl groups with a crosslinking agent.

14 Claims, 11 Drawing Sheets

| Crosslinking Agent | Crosslinking Agent E° (V) | Ave. Ultimate Shear Strength w/ S-1 (MPa) | Ave. Ultimate Shear Strength w/10-S-DHS-1 (MPa) |
|---|---|---|---|
| NONE | N/A | 0.23 | 0.16 |
| $Fe^{3+}$ | 0.77 | 0.27 | 0.27 |
| $V_3O_9^{3-}$ | 0.96 | 0.28 | 0.34 |
| $Cr_2O_7^{2-}$ | 1.23 | 0.32 | 0.77 |
| $MnO_4^-$ | 1.51 | 0.29 | 0.75 |

| Polymer | Ave. Ultimate Shear Strength (MPa) | Ave. Ultimate Shear Strength w/ 0.33Cr$^{6+}$:DHS (MPa) | Ave. Ultimate Shear Strength w/ ~10 mg (TBA)$_2$CR$_2$O$_7$ (MPa) | Ave. Ultimate Shear Strength w/ ~20 mg (TBA)$_2$CR$_2$O$_7$ (MPa) |
|---|---|---|---|---|
| 50-S-DHS-1 | 0.53 | 0.55 | 0.66 | 0.54 |
| 50-S-DHS-8 | 0.49 | 0.77 | 2.10 | 1.42 |
| 50-S-DHS-15 | 0.59 | 0.73 | 1.43 | 1.34 |
| 50-S-DHS-35 | 0.26 | 0.86 | 2.21 | 0.87 |
| 15-S-DHS-1 | 0.36 | 0.48 | 0.51 | 0.72 |
| 15-S-DHS-8 | 0.72 | 1.83 | 0.66 | 1.88 |
| 15-S-DHS-22 | 0.99 | 2.81 | 1.60 | 1.62 |
| 15-S-DHS-35 | 0.76 | 2.46 | 1.19 | 2.11 |
| 10-S-DHS-1 | 0.36 | 1.64 | 0.93 | 1.64 |
| 10-S-DHS-35 | 0.75 | 5.02 | 3.64 | 4.80 |
| 10-S-DHS-40 | 0.56 | 4.22 | 3.91 | 4.04 |
| 10-S-DHS-45 | 0.28 | 0.78 | 0.45 | 1.10 |
| 5-S-DHS-1 | 0.54 | 0.66 | 0.59 | 0.89 |
| 5-S-DHS-8 | 0.49 | 0.96 | 0.95 | 1.81 |
| 5-S-DHS-15 | 1.99 | 0.84 | 1.88 | 1.57 |
| 5-S-DHS-35 | 2.92 | 2.48 | 1.90 | 3.74 |
| 2-S-DHS-1 | 0.42 | 0.40 | 0.30 | 0.85 |
| 2-S-DHS-5 | 1.10 | 1.43 | 0.67 | 2.29 |

Fig. 7

| DMS:styrene ratio | styrene (mL) | DMS (mL) | n-butyl-lithium (mL) | toluene (mL) | yield % | $M_n^a$ (kDa) | $PDI^a$ | $^1H$ NMR δ (ppm) |
|---|---|---|---|---|---|---|---|---|
| 1:1,000 | 47 | 0.061 | 1.34 | 242 | 64 | - | - | 0.6-2.3 br<br>3.4-3.8 br<br>6.0-7.4 br |
| 1:50 | 47 | 1.2 | 1.37 | 247 | 95 | 9.5 | 1.38 | 0.6-2.4 br<br>3.4-3.7 br<br>6.1-7.4 br |
| 1:15 | 44 | 3.8 | 1.37 | 246 | 83 | 14.7 | 1.71 | 0.8-2.6 br<br>3.5-4.0 br<br>5.7-7.4 br |
| 1:10 | 42 | 5.4 | 1.35 | 244 | 83 | 16.1 | 1.92 | 0.8-2.6 br<br>3.5-4.0 br<br>5.8-7.6 br |
| 1:5 | 39 | 10.2 | 1.4 | 253 | 96 | 14.6 | 1.84 | 0.6-2.4 br<br>3.4-3.8 br<br>5.7-7.4 br |
| 100:0 | N/A | 6.0 | 0.17 | 45 | 87 | 43.9 | 1.37 | 0.6-2.8 br<br>3.1-4.9 br<br>5.5-7.1 br |
| 0:100 | 47 | N/A | 1.34 | 235 | 82 | 125.8 | 1.26 | 0.7-2.4 br<br>6.2-7.6 br |

FIG. 10

| cross-linker | copolymer 3,4-dimethoxystyrene: styrene ratio | | | | | | |
|---|---|---|---|---|---|---|---|
| | 12:88 | 3.4:96.6 | 4.1:95.9 | 1.3:98.7 | 0.6:99.4 | 100:0 | 0:100 |
| Fe(acac)$_3$ | 9,200 ± 2,000 | 7,900 ± 490 | 1,700 ± 150 | 13 ± 2 | 9 ± 2 | N/A | 8 ± 1 |
| [(C$_4$H$_9$)$_4$N]IO$_4$ | 20,000 ± 2,000 | 12,000 ± 630 | 1,400 ± 460 | 23 ± 11 | 10 ± 1 | 38,000 ± 3,700 | 7 ± 1 |
| [(C$_4$H$_9$)$_4$N]MnO$_4$ | 5,295 ± 318 | 5,400 ± 480 | 4,300 ± 354 | 31 ± 9 | 21 ± 3 | N/A | 8 ± 1 |
| [(C$_4$H$_9$)$_4$N]$_2$Cr$_2$O$_7$ | 39,000 ± 5,000 | 61,000 ± 5,800 | 45,000 ± 4,700 | 35 ± 7 | 9 ± 1 | 75,000 ± 3,000 | 7 ± 1 |
| Mn(OOCCH$_3$)$_3$ | 6 ± 1 | 6 ± 2 | 7 ± 1 | 13 ± 1 | 7 ± 1 | N/A | 8 ± 1 |
| Na$_3$VO$_4$ | 7 ± 1 | 8 ± 1 | 8 ± 2 | 16 ± 2 | 10 ± 2 | N/A | 5 ± 1 |
| Zn(NO$_3$)$_2$ | 2 ± 1 | 8 ± 1 | 7 ± 1 | 9 ± 2 | 13 ± 3 | N/A | 5 ± 1 |
| Ga(NO$_3$)$_3$ | 10 ± 1 | 11 ± 2 | 9 ± 4 | 8 ± 1 | 9 ± 1 | N/A | 4 ± 1 |
| Co(NO$_3$)$_2$ | 15 ± 2 | 23 ± 15 | 8 ± 1 | 9 ± 1 | 10 ± 1 | N/A | 5 ± 1 |
| t-C$_4$H$_9$OOH | 21 ± 6 | 9 ± 1 | 7 ± 1 | 8 ± 1 | 7 ± 1 | N/A | 5 ± 1 |
| [(C$_4$H$_9$)$_4$N]$_2$SO$_4$ | 9 ± 1 | 8 ± 1 | 8 ± 1 | 7 ± 1 | 7 ± 1 | N/A | 5 ± 1 |

FIG. 11

| cross-linker | adhesive strength (MPa) | |
| --- | --- | --- |
| | 3,4-dihydroxystyrene:styrene copolymer of 3.4:96.6 composition | polystyrene |
| None | 0.6 ± 0.2 | 0.2 ± 0.2 |
| $Fe^{3+}$ | 0.7 ± 0.2 | 0.4 ± 0.1 |
| $(IO_4)^-$ | 0.9 ± 0.1 | 0.2 ± 0.1 |
| $(Cr_2O_7)^{2-}$ | 1.2 ± 0.5 | 0.2 ± 0.1 |

FIG. 14

CROSS-LINKABLE POLYMERIC COMPOSITIONS

RELATED APPLICATIONS

The present patent application is a continuation-in-part of PCT Application Serial No. PCT/US2007/009986, filed Apr. 25, 2007, which claims priority to Provisional U.S. Patent Application Ser. No. 60/795,021 filed Apr. 25, 2006; designating the United States and published in English, which is hereby incorporated by reference.

The present patent application claims the benefit of the filing date under 35 U.S.C. §119(e) of Provisional U.S. Patent Application Ser. No. 60/925,589, filed Apr. 20, 2007, and Provisional U.S. Patent Application Ser. No. 60/926,145, filed Apr. 25, 2007, which are hereby incorporated by reference.

FEDERALLY SPONSORED RESEARCH OR DEVELOPMENT

This invention may have been made with United States government support from the National Science Foundation grant number 0094281-CHE. The United States Government may have certain rights in this invention.

BACKGROUND

Polymers have important and wide-ranging applications. For example, orthopedic repairs, prosthesis implantation, soft tissue healing, sutures, and timed release of drugs all utilize polymers. Polyethylene is often used in joint replacements. Ligament and tendon repairs may employ polytetrafluoroethylene (PTFE, Teflon®) or condensation polymers (Dacron). Catheters may be made of PTFE or polyurethanes. Skin repair templates may use silicone and collagen. Polymethylmethacrylate (PMMA) is used for bone cement and replacement eye lenses. Similarly, dental cements are made from acrylics polymers (polyacrylic acid, PAA) cross-linked with calcium or zinc.

Despite these advances in biomaterial development, significant need for new compositions persists. Surgical adhesives, non-fouling implant surfaces, and scaffolds for tissue engineering are all applications for which improved compositions are still very much required.

Biological environments tend to be wet, contain large amounts of possible foulants (e.g., proteins, polysaccharides, cells), and may impart large mechanical stresses. In the case of surgical adhesives, for example, a suitable composition may have the following qualities: the ability to set in wet environments, create strong bonds with both soft tissue and hard bone, cure on a reasonable time scale, be convenient to work with, and be biocompatible. At this time, no available composition meets all these requirements well.

The two most commonly used surgical adhesives are fibrin and the cyanoacrylates. Fibrin is a two tube sealant comprised of fibrinogen and thrombin, essentially making a blood clot upon mixing. Biocompatibility is excellent, but bond strengths are weak and the composition is difficult to handle. The cyanoacrylates (e.g., ethylcyanoacrylate, "Super Glue") can make strong bonds to tissue, but the cured adhesive is brittle and suffers from induction of acute inflammatory responses. In general, compositions like cyanoacrylates that are based upon reactive monomers, ready to polymerize after application to a surface, may not be suitable for biomedical applications. The reactive nature of such monomers tends to result in toxicity.

The oral environment is particularly problematic for adhesion. Mechanical stresses, a changing environment, and high levels of bacteria all challenge adhesion to teeth. Current dental cements are based upon zinc phosphate, zinc polyacrylic acid (PAA), or a glass ionomer consisting of a polycarboxylate (e.g., PAA) with an aluminosilicate. Although the biocompatibility and physical properties of these cements are good, they do not seal sufficiently well to teeth. Microleakage also is common and often leads to secondary caries and cement failure. Similar problems can arise with skeletal hard connective tissue repaired by use of ceramics and glasses (e.g., alumina, silica, hydroxyapatite). Here too, obtaining a good bond to the surface has proven difficult. Failure at the biomaterial-tissue interface is common.

Desirable medical adhesives and cements may be either degradable or permanent, depending upon the application. A soft tissue adhesive, for example, may be degraded after complete healing. For a bone cement, by contrast, permanent attachment is typically required.

In general, when two surfaces are in contact and placed under deformation, a modulus mismatch may yield high levels of interfacial stress. For example, attaching a soft tissue to a harder bone, a desirable adhesive may provide a gradient of moduli spanning the range from one surface to the next, in order to minimize interfacial stresses. Indeed, a significant problem with current polymethyl methacrylate (PMMA) bone cements is this modulus mismatch. For example, PMMA cements may be too hard, put stress on the interface with bone, and wear out.

At this time, no synthetic adhesive or cement can set in a wet environment, form strong bonds, provide a suitable modulus match to the surrounding tissue, and is biocompatible. Furthermore, new compositions are still required for bone and dental cements, nonfouling surfaces, controlled drug release, and tissue engineering scaffolds. These properties may also be desirable to applications in industry, scientific research, and consumer products, among other things.

Novel adhesive mechanisms may be generated by synthetically mimicking mechanisms used in nature by, for example but not limited to, barnacles, marine mussels, oysters, giant clams, starfish, sea cucumbers, limpets, soft coral, kelp, etc.

Barnacles and marine mussels are examples of animals able to affix themselves to nearly any surface, including polytetrafluoroethylene (PTFE, Teflon®). In order to set in wet environments, these organisms may apply proteins to surfaces of interest. Extensive cross-linking of the proteins may yield cured adhesives or cements. Although the exact nature of such protein-protein interactions is not yet known, the unusual amino acid 3,4-dihydroxyphenylalanine (DOPA) may be central to curing of mussel adhesive proteins. Cross-linking of DOPA-containing proteins may be a result of chemical oxidation, enzymatic oxidation, or metal chelation followed by radical generation.

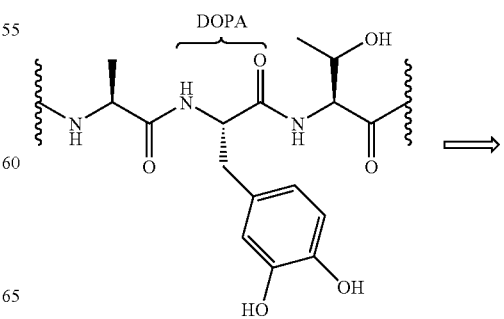

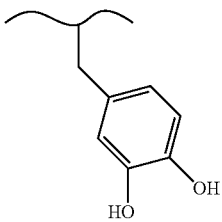

Mussels may use iron for protein cross-linking and adhesive formation. More specifically, the iron in mussel adhesive may be bound by three DOPA residues, as shown in FIG. 1.

Oxygen may then react with this iron center to yield a protein based radical. Subsequent radical-radical coupling to further cross-link the composition, as well as radical surface coupling to create adhesive bonds, may then follow. Formation of these radicals may proceed by a mechanism similar to that proposed for the intradiol catechol dioxygenase enzymes. An $Fe^{3+}$-DOPA may undergo valence tautomerism to $Fe^{2+}$ semiquinone followed by $O_2$ reaction with the semiquinone ligand. The radical species may be reactive given that it is short lived. Radical species may be present in barnacle cement. Thus radicals may be important intermediates in marine biomaterial generation.

Expression of DOPA-containing proteins has proven difficult. Enzymatic oxidation of tyrosine containing synthetic polypeptides may yield DOPA-containing products. Long polypeptides with DOPA may also be directly prepared. In general, however, proteins and polypeptides with DOPA residues may be impractical to products on a large scale and prohibitively expensive.

BRIEF SUMMARY

A new class of polymer compositions is disclosed. A family of polymers may be prepared in which cross-linking groups are incorporated. The copolymer may comprise pendant dihydroxyphenyl groups; and a crosslinking agent selected from the group consisting of, for example, oxidants, enzymes, metals, and light. The polymer compositions may have varied properties (e.g., hardness, crystallinity) and may have varied degrees of incorporated cross-linking groups. The polymers may be prepared such that they can be cross-linked with many different reagents (e.g., oxidants, enzymes, metals, light, etc.) For example but not limited to a series of polystyrene derivatives into which may be incorporated catechol. Catechol groups may serve as a mimic of 3,4-dihydroxyphenylalanine (DOPA), which may be the key cross-linkable group in mussel adhesive proteins. Cross-linking of bioinspired polymers may result in a very strong adhesive composition.

A class of bioinspired, cross-linking polymers may be prepared by distributing catechol functionalities into the backbone of a bulk polymer. These polymers may cross-link in a manner analogous to that found for mussel adhesive proteins, but without the complexity of a polypeptide backbone or a variety of amino acid side chains. Varied cross-linking groups may be incorporated into different backbones, and subsequently reacted with an array of reagents. By combining the approaches of marine biological compositions generation with the accessibility of synthetic polymers, a nearly limitless array of new compositions for tissue engineering platforms, nonfouling compositions, and medical adhesives may be developed. The compositions may also have broad applications in diverse areas from industry to consumer products and beyond.

Method of making a copolymer composition, which may be an adhesive, including steps of, for example, anionic polymer synthesis. The method may comprise copolymerizing a first monomer comprising pendant dihydroxy-protected dihydroxyphenyl groups; deprotecting the dihydroxy-protected dihydroxyphenyl groups; crosslinking the dihydroxyphenyl groups with a crosslinking agent.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIG. 7 illustrates exemplary average ultimate shear strengths of various polymers with a dichromate crosslinking agent, under the conditions of Example 3.

FIG. 10 is a table illustrating exemplary polymer synthesis conditions and characterizations.

FIG. 11 is a table of exemplary average penetration forces (in mN) for reaction of polymers of varied 3,4-dimethoxystyrene:styrene ratios with different exemplary crosslinking reagents.

FIG. 14 shows exemplary shear adhesive strengths of a 1:10 3,4-dihydroxystyrene:styrene copolymer after crosslinking.

DETAILED DESCRIPTION

Figure 1:
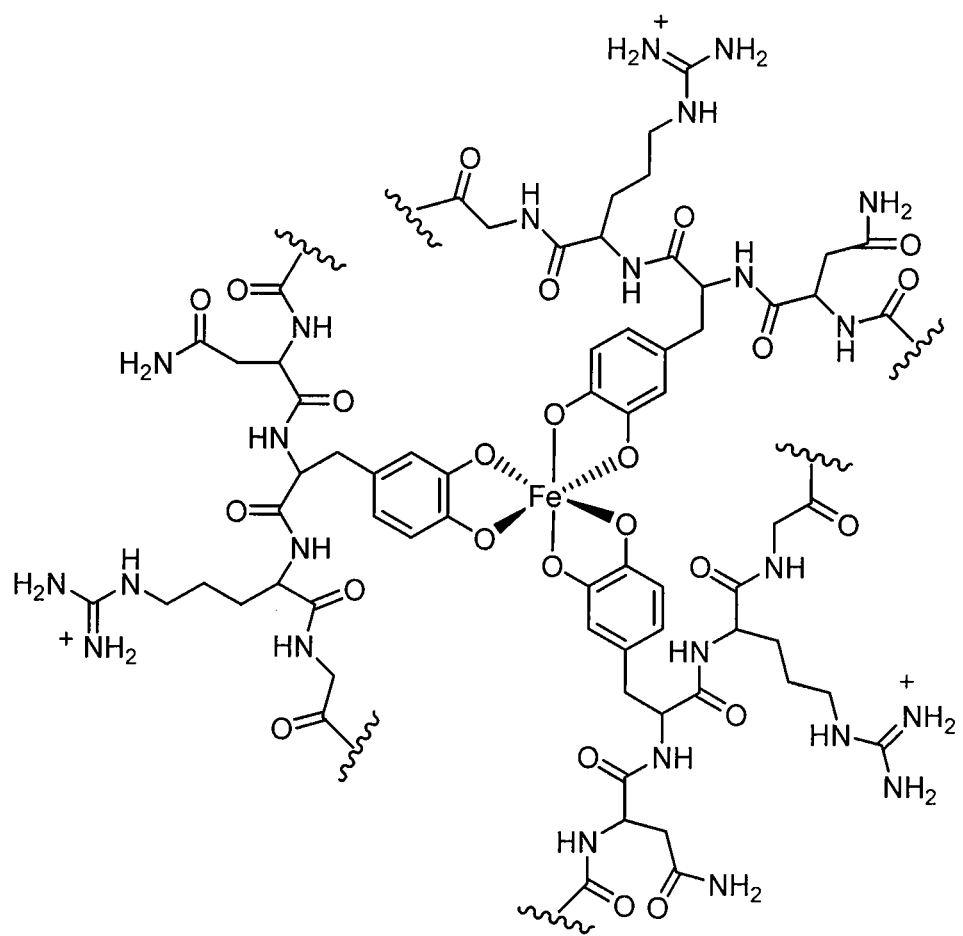
FIG. 1 is an exemplary structure of the iron-protein cross-linking in marine mussel adhesives.

A class of bioinspired, cross-linking polymers by distributing catechol functionalities into the backbone of a bulk polymer is disclosed. These polymers may cross-link in a manner analogous to that found for mussel adhesive proteins. A general approach to designing compositions is disclosed, in which varied cross-linking groups may be incorporated into different polymer backbones, and subsequently reacted with an array of reagents. By combining the approaches of marine biological compositions generation with the accessibility of synthetic polymers, a nearly limitless array of new compositions may be developed for tissue engineering platforms, nonfouling compositions, medical adhesives, industrial and consumer applications.

The functionality of, for example, a marine biological composition may be reduced to a polymer, a cross-linkable group, a metal, and oxygen. The disclosed synthetic compositions may be used to create polymer systems for many applications, including but not limited to applications in medicine, dentistry, scientific research, industry, and consumer products.

Catechol groups may be incorporated into polystyrene. Cross-linking reactions may transform polystyrene, for example, into an adhesive, which may be modified to a range of strengths. DOPA-proteins, metals, and oxygen may be involved in synthesis of the disclosed compositions. Adhesive formation may begin with the chelation of three DOPA-containing protein strands about an $Fe^{3+}$ metal center. Subsequent reaction with oxygen may yield the formation of a protein-based radical. This oxidized protein may then undergo protein-protein coupling to generate covalent cross-links or protein-surface bonding for adhesion. Alternatively, simple oxidation or enzymatic oxidation may be utilized.

For example, 3,4-dihydroxystyrene may be distributed into a polymer backbone.

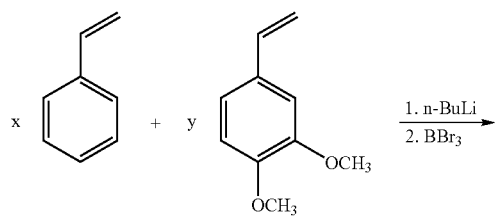

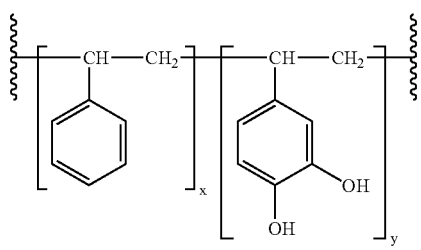

The reactivity of this 3,4-dihydroxystyrene monomer may be different from styrene. Polystyrene may also be examined owing to ease of large scale synthesis and tight control of molecular weights (i.e., low polydispersity) when using anionic polymerization methods. The invention is not limited to the polystyrene polymer backbone, this polymer backbone is merely utilized in the disclosure because it is convenient for illustrating composition design.

Alternative cross-linked polymer materials may be prepared by varying the polymer backbones, cross-linkable groups, and cross linking agents. For example, the following variations may be made. Polymer backbones such as, but not limited to polyethyleneglycol (PEG), PMMA/PAA, polylactic acid/polyglycolic acid (PLGA) may be utilized. Possible cross-linking groups include, but are not limited to, catechol, thiol, and the like. Potential cross-linking agents include, but are not limited to, oxidants, metals, and the like.

Copolymers of, for example but not limited to, styrene and 3,4-dimethoxystyrene may be prepared by standard methods using n-butyllithium initiator. Copolymer of monomers which mimic other amino acids, for example, those amino acids capable of crosslinking by metal chelation (e.g., histidine analogs, imidazoles) and oxidation (e.g., cysteine analogs, thiols) may also be incorporated into polymers.

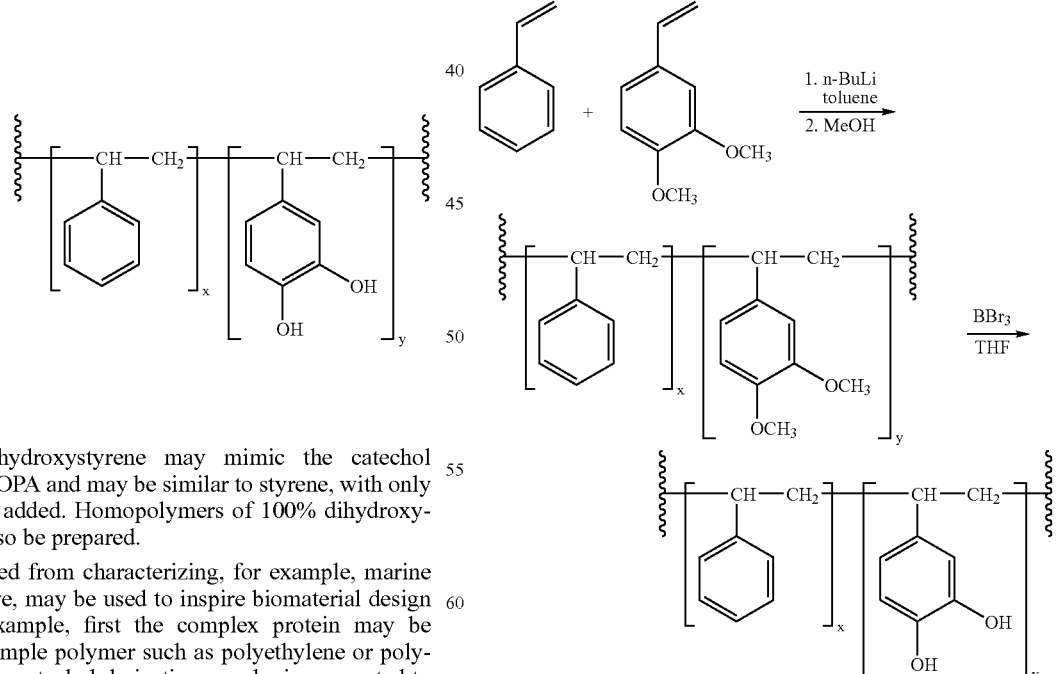

This 3,4-dihydroxystyrene may mimic the catechol sidechain of DOPA and may be similar to styrene, with only two hydroxyls added. Homopolymers of 100% dihydroxystyrene may also be prepared.

Data collected from characterizing, for example, marine mussel adhesive, may be used to inspire biomaterial design efforts. For example, first the complex protein may be reduced to a simple polymer such as polyethylene or polystyrene. Next, a catechol derivative may be incorporated to mimic DOPA. Polystyrene serves as a non-limiting example in this disclosure.

3,4-dihydroxystyrene is a small chemical perturbation from styrene, with only two hydroxyls added.

The amount of each monomer in the final polymer (x and y in Figure below) may be varied by simply altering the ratio of starting monomers.

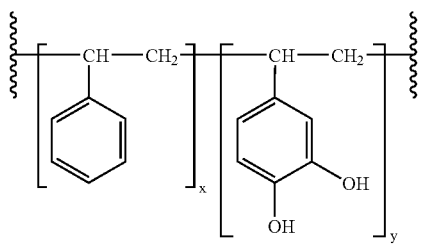

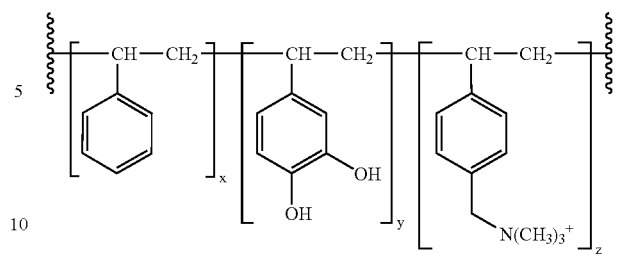

Both monomers may copolymerize with even incorporation, as determined by integrals of each broadened monomer signal in $^1$H nuclear magnetic resonance (NMR) spectra. The methoxy groups may be deprotected with BBr$_3$ to yield the final, catechol-containing polymer.

In another embodiment, cross-linked polymer materials comprise monomers of 4-benzyltriethylammoniumstyrene. For example, in one embodiment, cross-linked polymer materials may be terpolymers having the formula:

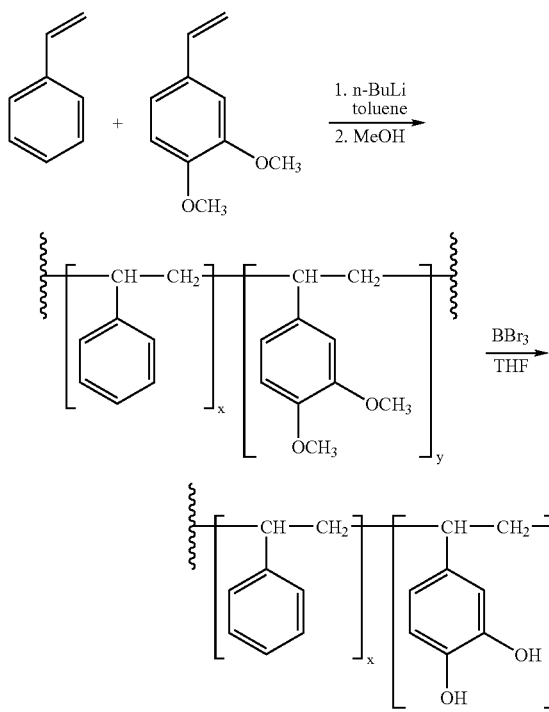

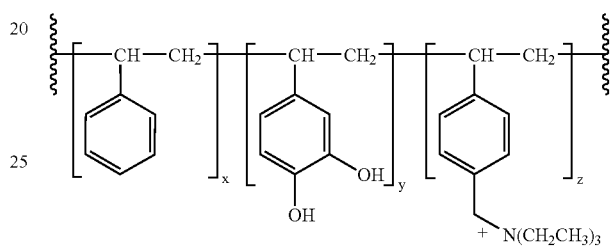

In another embodiment, cross-linked polymer materials comprise monomers of vinylpyridine. For example, in one embodiment, cross-linked polymer materials may be terpolymers having the formula:

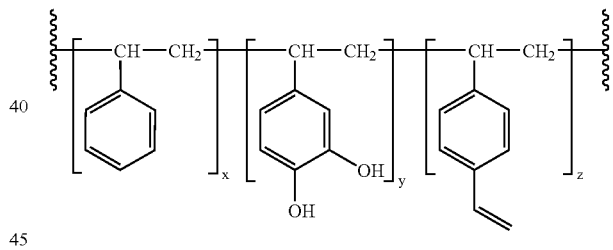

In another embodiment, cross-linked polymer materials comprise monomers of styrene sulfonate having the formula,

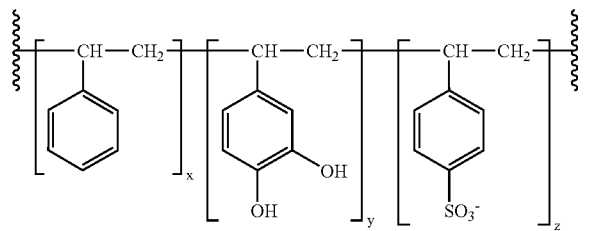

In another embodiment, instead of 3,4-dimethoxystyrene, copolymers may comprise 2,3-dimethoxystyrene. For example, in one embodiment, cross-linked polymer materials may be terpolymers having the formula:

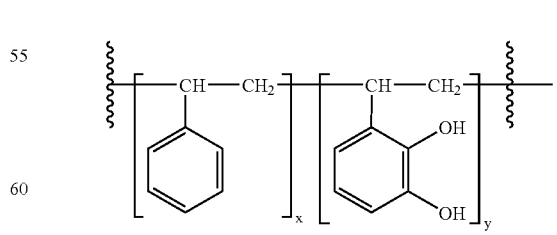

In another embodiment, cross-linked polymer materials comprise monomers of 4-benzyltrimethylammoniumstyrene. For example, in one embodiment, cross-linked polymer materials may be terpolymers having the formula:

In yet another embodiment, copolymers may comprise monomers of polylactic acid or polyethylene glycol. For example, in embodiments, cross-linked polymer materials may be terpolymers having the formula:

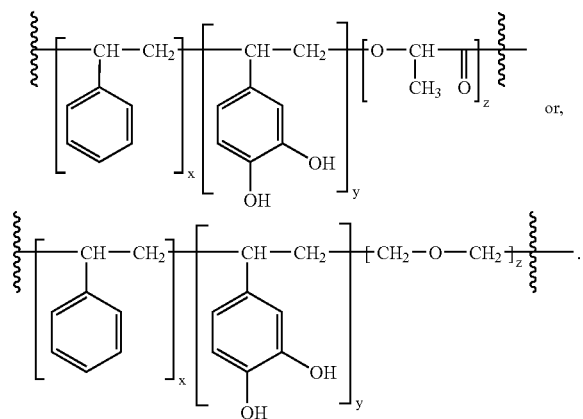

The polymers may be characterized, for example, with gel permeation chromatography (GPC) to provide typical molecular weights and polydispersities. The molecular weights may be varied by altering the initiator: monomer ratios. Typical molecular weights may range between about 3,000 and about 120,000, depending upon this ratio. Polydispersities may typically fall between about 1.1 and about 1.8.

Differential scanning calorimetry (DSC) may be used to show that 3,4-dimethoxystyrene incorporation into the polymer may occur in a random, and not block, manner. A 100% polystyrene polymer may yield a glass transition temperature (Tg) of about 97.4° C. The homopolymer of, for example, 100% 3,4-dimethoxystyrene provided a T.=68.3° C. A 5:1 copolymer of styrene (83%) and 3,4-dimethoxystyrene (17%) may show a single phase transition between these two extremes, with a Tg of about 93.9° C.

Additionally, copolymers of styrene may also be prepared with 2,3-dihydroxystyrene (an isomer of 3,4-dimethoxystyrene), mimics of crosslinkable amino acids, amino acids, PEG, PMAA/PAA, PLGA, and etc. However, the following examples utilize the 3,4 derivative for illustration of the system.

Cross-linking reactions of these polymers may be examined with a penetration test. A polymer may be dissolved in an organic solvent at high concentrations (e.g., 1 g/mL) to yield a viscous solution. Cross-linking agents may then be mixed into the solution and curing, where applicable, may be observed directly by using the penetration test (see Example 13).

For example, polymers of styrene:3,4-dihydroxystyrene ratios of 1,000:1, 100:1, 50:1, 15:1, 10:1, and 5:1, as well as 100% homopolymers of each styrene and 3,4 dihydoxystyrene may be examined. Potential cross-linking reagents that may be examined may include (but are not limited to) $[(C_4H_9)_4 N]IO_4$, tertiary-$C_4H_5$—OOH, Fe(acetonylacetonate)$_3$, $[(C_4H_9)_4N](MnO_4)$, Mn(OOCCH$_3$)$_3$, $[(C_4H_9)_4N]_2(Cr_2O_7)$, Na$_3$VO$_4$, Zn(NO$_3$)$_2$, Ga(NO$_3$)$_2$, Co(NO$_3$)$_2$, and $[(C_4H_9)_4N]_2(SO_4)$.

In one embodiment, the cross-linking reagent is selected from the group consisting of $[(C_4H_9)_4N]IO_4$, tertiary-$C_4H_5$—OOH, Fe(acetonylacetonate)$_3$, $[(C_4H_9)_4N](MnO_4)$, Mn(OOCCH$_3$)$_3$, $[(C_4H_9)_4N]_2(Cr_2O_7)$, Na$_3$VO$_4$ $[(C_4H_9)_4N]_3$ V$_3$O$_9$, and combinations thereof.

For a given exemplary reagent, in general, more cross-linking may be observed with higher percentages of 3,4-dihydroxystyrene, relative to styrene, incorporated into the polymer. A 100% polystyrene control may not show detectable cross-linking. The oxidizing metallic reagents, for example, $[(C_4H_9)_4N](MnO_4)$ and $[(C_4H_9)_4N]_2(Cr_2O_7)$, along with the simple oxidant $[(C_4H_9)_4N]IO_4$, may bring about the most curing. Some viscosity increase may be observed with Fe(acetonyl acetonate)$_3$.

The other exemplary reagents may exhibit little or no detectable cross-linking. This pattern of effective cross-linkers may be similar to those found when working with the DOPA-containing proteins extracted from mussels. In order to bring about significant curing, ~2% or higher 3,4-dihydoxystyrene may be required in the polymer.

Adhesive properties of these polymers may be examined. A typical test, explained briefly, may begin with a polymer (e.g., 10 mg in 15 μL acetone) and a cross-linking agent (e.g., 2 mg in 10 μL acetone) mixed on a metal adherend (e.g., aluminum coupon). A second adherend may be added and the sample cured under varied conditions. The adhesive bond may then be pulled to failure and this maximum shear load may be measured on an Instron 5544 Materials Testing Machine. Adhesive force, in Newtons, may be divided by overlap area to provide data in Pascals (Pa=N/m$^2$) or MegaPascals (MPa).

These exemplary adhesion studies may be an adaptation of the ASTM D1002 standard method, with reusable aluminum coupons for rapid sample assessment and less overlap area to bring data down into the middle range of the instrument. The most effective cross-linking agents, discussed above for both proteins and polymers, may yield the greatest adhesion strength, may include Fe(acetonylacetonate)$_3$, $[(C_4H_9)_4N](MnO_4)$, and $[(C_4H_9)_4N]_2(Cr_2O_7)$. Chromium toxicity may preclude use of this reagent in biomedical compositions, but it may be used in other, non biomedical applications where toxicity is not an issue. Further, it provides examples of trends in the reagents most effective at bringing about protein and polymer bonding.

Under certain conditions, adhesive bonding strength of $Fe^{3+}$, for comparison, may generally be half that of $Mn^{7+}$ and $Cr^{6+}$. In addition to varying cross-linking agents, the following may also be changed or varied: cure time, temperature, total quantity of polymer, concentrations, and ratio of catechol group:cross-linker. Polymer molecular weight and composition may also be controlled/varied.

Figure 2:
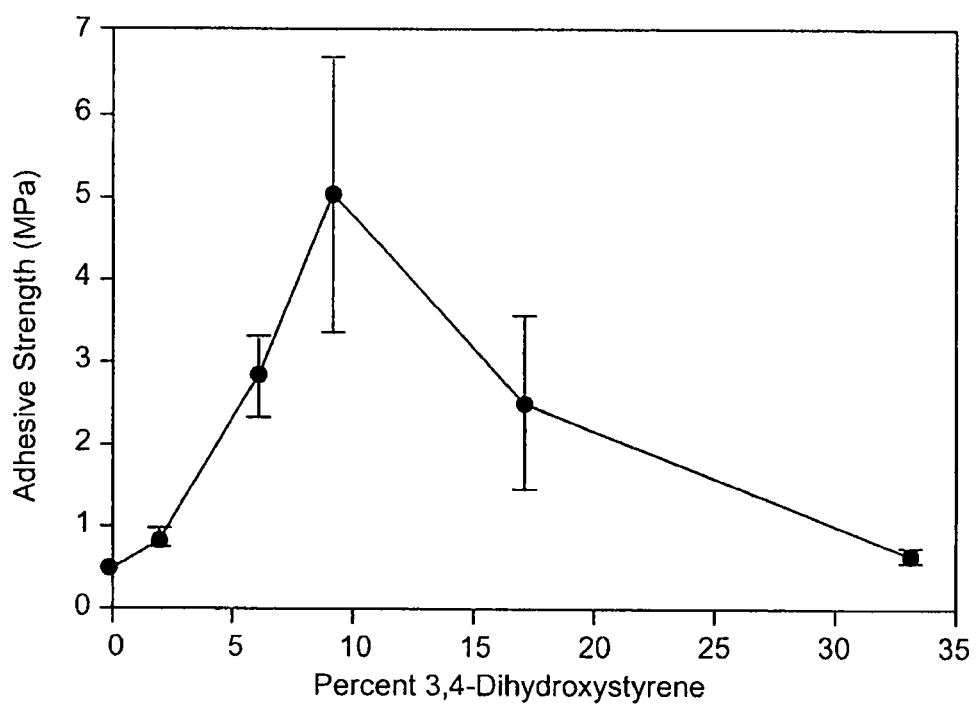
FIG. 2 is a chart of exemplary results of the effect of controlling polymer composition on shear adhesive strength.

FIG. 2, illustrates exemplary results of a test of adhesive strength of a series of styrene-3,4-dihydoxystyrene copolymers, each cross-linked with $[(C_4H_9)_4N]_2(Cr_2O_7)$ under identical cure conditions. The styrene-co-3,4-dihydoxystyrene copolymers examined included those with 3,4-dihydoxystyrene content at 0%, 2%, 6%, 9%, 17%, and 33%. Maximum adhesion may be about 5.0 (±1.7) MPa with the 10:1 polymer.

To put these adhesive strength data in perspective, the bioinspired adhesive at 5.0 (±1.7) MPa, under the conditions of this experiment, may be stronger than typical pressure sensitive (~0.05 MPa), starch (~0.5 MPa), cellulosic (~2 MPa), and polyvinyl alcohol (white glue, ~3 MPa) adhesives. Cyanoacrylate (~10 MPa), urethane (~12 MPa), and epoxy (~25 MPa) adhesives may be stronger.

Silver (I) ions may also be incorporated in the cross-linked polymer adhesives these adhesives may then display antibacterial and antifouling properties, in addition to being adhesive. Silver (I) ions are known to display antibacterial and antifouling properties. Accordingly, silver (I) ions have been used in various biomedical devices. The silver in biomedical devices may behave as a simple antibiotic, thereby preventing buildup of bacterial biofilms. Various recent biomedical devices, such as stents, are now incorporating silver in various forms.

In one embodiment, the cross-linked polymer adhesives incorporate silver (I) ions. The adhesives may release the silver slowly, quickly, or not at all. The rate of release of silver (I) ions will depend on the qualities of the adhesive. For example, in another embodiment, the silver ions are released over the course of several months. In another embodiment, the silver (i) ions remain bound.

An assessment of adhesion to a biologically relevant substrate may be made, for example, with hydroxyapatite blocks of 2.5×0.9×0.6 cm. A 10:1 styrene:3,4-dihydoxystyrene copolymer may be placed between two hydroxyapatite blocks and cured with $[(C_4H_9)_4N]_2(Cr_2O_7)$. Pulling the blocks apart in shear mode may result in the blocks breaking while the adhesive bond remained intact. Substrate failure may occur at the equivalent average force of 2.5 MPa.

Other versions of these cross-linkable polymers may also be prepared. For example, but not limited to, soluble or wettable versions. Terpolymers in one embodiment terpolymers comprise styrene, 3,4-dihydoxystyrene, and styrenesulfonate are combined in random or block copolymers.

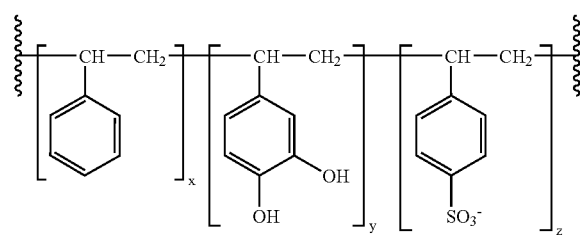

For example, when preparing terpolymers in which styrene, 3,4-dihydoxystyrene, and styrenesulfonate are combined in random copolymers; protection of the —$SO_3^-$ group may be required. The starting monomer, neopentyl p-styrenesulfonate, may not copolymerize with the typical n-butyllithium. Consequently, these terpolymers may be synthesized using nitroxide-mediated radical polymerization with 2,2'-azobis(2-methylpropionitrile) (AIBN) for initiation and the radical 2,2,5,5-tetramethyl-4-diethylphosphono-3azahexane-3-nitroxide (DEPN) for capping.

Water solubility may be found when the styrene sulfonate content of the polymer is over ~40%. Cross-linking reactions may proceed rapidly with the typical metallic and oxidizing reagents.

EXAMPLES

The following examples provide a detailed illustrative description of the disclosed molecules. The examples in no way restrict the technical scope of the present invention. The examples merely illustrate how a wide array of properties, such as adhesive strengths, may be achieved by varying particular elements of the system. These examples are not meant to be limiting and other systems and compositions are contemplated.

Examples 1-7

Examples 1-7 which follow provide one exemplary polymer synthesis and characterization system. Other exemplary systems will be provided to illustrate the diversity of the system. These examples are not meant to be limiting, other systems and compositions are contemplated.

Example 1

The following description provides one of many possible mechanisms of polymer synthesis. Synthesis of the disclosed molecules is not limited to the specific compositions or methods described below. Other methods, equipment, and reagents may be utilized to achieve polymer synthesis.

Styrene may be inhibited, for example, with approximately 10-15 ppm of 4-tert-butylcatechol. Polymer synthesis may begin with monomer purification. Column chromatography may be used to separate 4-tert-butylcatechol inhibitor from styrene and the hydroquinone inhibitor from 3,4-dimethoxystyrene. A glass tube may be packed with, for example, ⅛ in. of cotton, ⅛ in. of sand, 3 to 4 inches of oven dried alumina, and ⅛ in. of potassium carbonate. Each monomer may be added to its own column and allowed to elute. Care may be taken to prevent the red color present on the column elute into the collection flask. The inhibitor may be removed within approximately 12 hours prior to polymerization and may be stored at 4° C.

Synthesis of poly[styrene-co-(3,4-dihydroxystyrene)] may follow monomer purification. After heating overnight in a glassware oven at, for example, approximately 105° C., a 100 mL Schlenk flask fitted with a rubber septum may be placed under vacuum, flame dried until no vapor is visible, and then backfilled with Argon. This flame drying procedure may be repeated twice.

Upon cooling to room temperature, the flask may be charged with 50 mL of dry toluene under Argon, for example, using a gas-tight syringe. While stirring, uninhibited styrene and 3,4-dimethoxystyrene (total of 10 mL of monomer) may be syringed into the solution, and then placed on a dry/ice isopropanol bath. After cooling to approximately −78° C., an approximately 2.5 M solution of n-butyllithium (exemplary amounts which may be added are listed in FIG. 10) in hexanes may be added by gastight syringe to the reaction flask. Care may be taken to add the n-butyllithium very slowly and dropwise. The resulting solution may display a color between light orange and deep red, where the greater amount of n-butyllithium may result in a deeper red color. The reaction may be kept under a positive argon pressure and at a temperature of approximately −78° C., for example, by the continued addition of dry ice to the dry ice/isopropanol bath. After eight hours, the bath may be topped off with dry ice and transferred to a refrigerator at approximately 4° C.

After approximately ten hours, the flask may be removed from the refrigerator, and ~1 mL of room temperature methanol may be added to the reaction flask. The solution may then be poured into a 1 L round bottom flask charged with 200 mL of methanol. This may result in the immediate precipitation of a white polymer. The flask may then be immediately dried, for example by rotovapping. The resulting poly[styrene-co-(3,4-dimethoxystyrene)] may be redissolved in dichloromethane, transferred to a 100 mL round bottom flask, and rotovapped to dryness again. The polymer may then be placed under vacuum overnight to remove any residual solvent.

Conversion of poly[styrene-co-(3,4-dimethoxystyrene)] to poly[styrene-co-(3,4-dihydroxystyrene)] may be accomplished by the use of, for example, boron tribromide. A 100 mL Schlenk flask (flame dried as previously described) may be charged with a stir bar and 3-4 grams of poly[styrene-co-(3,4-dimethoxystyrene)]. 50 mL of dry dichloromethane may be added by gas-tight syringe, and stirred until all polymer is dissolved and the solution is clear.

The flask may be cooled to 0° C., for example, by immersion in an ice water bath for 30 minutes. A 3-fold molar excess of boron tribromide to 3,4-dimethoxystyrene (as pure liquid or solution in hexanes) may then be added to the reaction flask by gas-tight syringe affording a brown solution. The flask may be allowed to gradually warm to room temperature and to stir overnight under a positive pressure of argon.

The reaction mixture may be poured into 300 mL of an aqueous 0.1 M HCl solution in a 500 mL Ehrlenmeyer flask at approximately 4° C. and stirred for approximately 15 minutes at 4° C. The aqueous layer may be removed and poured through a filter, leaving a white suspension in the dichloromethane phase. 300 mL of an aqueous 0.1 M HCl solution may then be added to the white suspension and stirred for 15 minutes at 4° C., and then the aqueous layer may again be removed. The resulting whitecomposition may then be washed twice by stirring in 300 mL of nanopure water and the aqueous phase may then be dumped out. The polymer may be washed into a 1 L round bottom flask with dichloromethane, and rotovapped (e.g., cold trap filled with ice and vacuum provided by a water aspirator) to near dryness. Some water may then be poured out of the flask, and significant amounts of water may further be removed by drying on a rotovap using a water aspirator and a cold trap filled with dry ice/isopropanol. The last traces of water may then be removed, for example, by drying on a rotovap using a pump and a liquid nitrogen trap. Care may be taken not to heat the flasks higher than 35° C. while rotovapping. The resulting poly[styrene-co-(3,4-dihydroxystyrene)] may be placed under vacuum overnight.

The following example is merely illustrative and not limiting. The general identification of the different poly[styrene-co-(3,4-dihydroxystyrene)] and poly[styrene-co-(3,4-dimethoxystyrene)] polymers may be done as follows: An example identification is carried out with 10-S-DMS-35, where 10-identifies the ratio of styrene to 3,4-dihydroxystyrene monomers used in the polymerization; -S-, DMS-, or -DHS-identifies the polymerized monomers styrene (S), 3,4 dimethoxystyrene (DMS), or 3,4-dihydroxystyrene (DHS); and −35 identifies the volume ratio (mL:mL) of monomer to n-butyllithium initiator used in the polymerization. This example is merely illustrative and not limiting.

$^1$H-NMR Spectroscopic Characterization of Polymers may be performed as illustrated in the following exemplary description. $^1$H-NMR spectra may be collected, for example, using a Gemini 200 MHz spectrometer and all samples may be prepared, for example, in deuterated chloroform.

Figure 3:
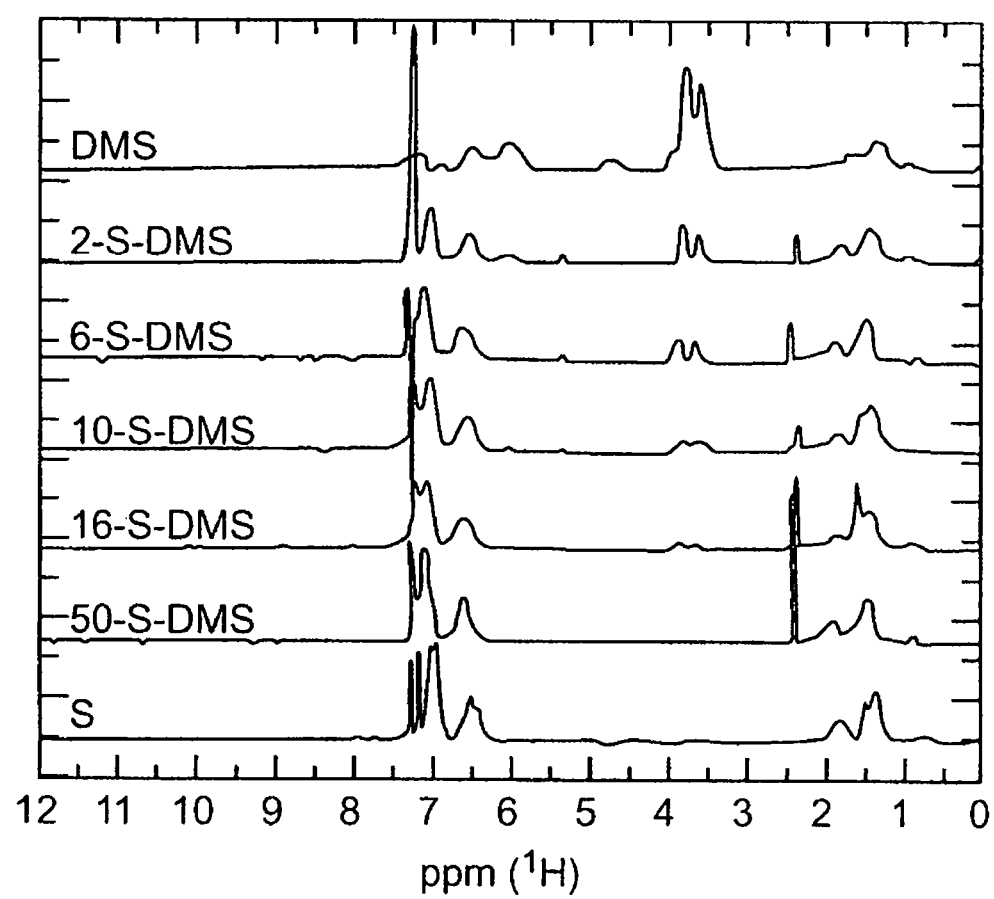
FIG. 3 is an exemplary NMR spectra illustrating the effect of the percentage of 3,4-dimethoxystyrene on the number of methoxy groups in the resulting polymer, under the conditions of Example 1.
Figure 4:
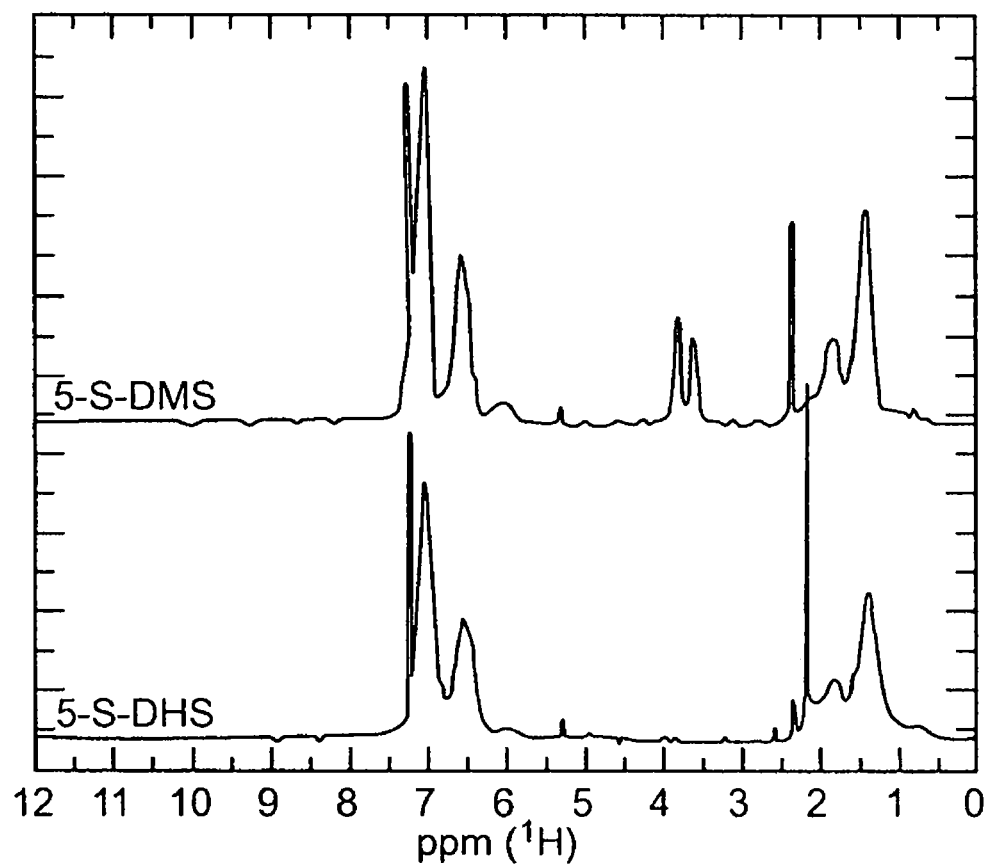
FIG. 4 is an exemplary $^1$H-NMR spectra of 5-S-DMS and the deprotected polymer 5-S-DMS, under the conditions of Example 1.

FIGS. 3 and 4 provide exemplary NMR spectra for the polymers of the present example. These exemplary spectra display a broad group of peaks between about 6 to about 8 ppm for the aromatic hydrogens, a broad group of peaks between about 0.5 to about 3 ppm, and two broad peaks between about 3.5 to about 4.0 ppm for the methoxy peaks.

FIG. 3 shows that as the percentage of 3,4-dimethoxystyrene is increased in the polymerization, more methoxy groups may be observed in the resulting polymer. The integration of these peaks confirms that the ratio of monomers used in the polymerization is also present in the polymers obtained.

FIG. 4 shows an exemplary $^1$H-NMR spectra of 5-S-DMS and the deprotected polymer, 5-S-DMS. The methoxy peaks may disappear between about 3.5 to about 4 ppm under the conditions of this Example. The disappearance of the methoxy peaks may indicate the completion of the methoxy deprotection reaction.

The following example is merely illustrative and not limiting. This example illustrates bow differential scanning calorimetery may be used to determine the glass transition temperatures (Tg) of the synthesized polymers, using, for example, a TA Instruments 2920 modulated differential scanning calorimeter.

Prior to testing, all polymer samples may be baked in an oven at 110° C. for 1 week. Approximately 7.0 mg of polymer may be weighed out into a hermetically sealed aluminum pans. The pans may be held at 10° C. for 5 min and then heated to 200° C. at 10° C./min.

Figures 5, 6:
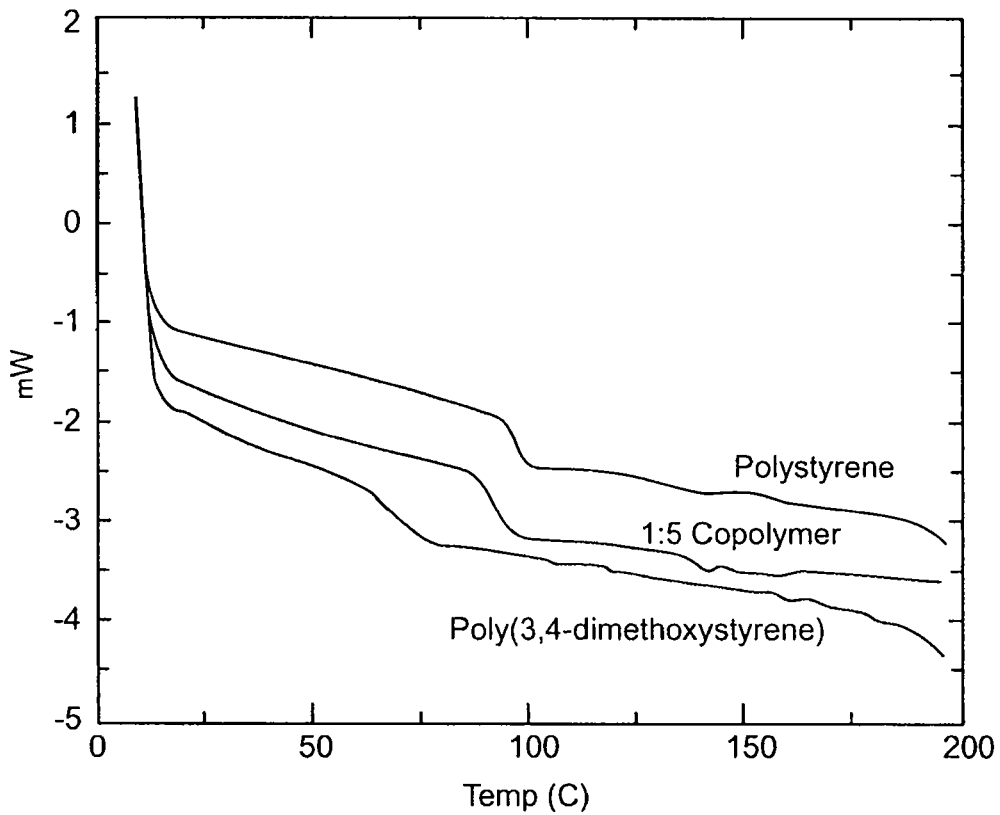
FIG. 5 is an exemplary differential scanning calorimetry of polystyrene, 5-S-DMS-35, and poly[3,4-dimethoxystyrene], under the conditions of Example 1.
FIG. 6 is an exemplary chart of the effect of various cross-linking agents on ultimate shear strength, under the conditions of Example 2.

FIG. 5 illustrates exemplary DSC thermographs for polystyrene, 5-S-DMS-35, and DMS-1. Glass transition temperatures may be observed as endothermic shifts in the DSC thermograph. The observed Tg for the polymers in this illustration are ~97.4° C., ~93.9° C., and ~68.3° C., respectively. Homogeneous and random copolymers may display sharp steplike features, while block copolymers may display either multiple steps or very broad transitions. The sharp step displayed by 5-S-DMS-35 in the thermograph may indicate that the synthesized copolymers are random, not block, copolymers.

Example 2

The following exemplary experiments illustrate exemplary shear adhesive strength of the polymers synthesized by the method in Example 1.

Exemplary effect of crosslinking agent. The effect of crosslinking agents may be tested, for example but not limited to, using Fe(acetonylacetonate)$_3$, (TBA)$_3$V$_3$O$_9$, (TBA)MnO$_4$, and (TBA)$_2$Cr$_2$O$_7$ as the cross-linking agents The number of agents used may be limited due to the solubility of the polymers. The polymers of this example may be soluble only in nonaqueous solutions.

Initial shear tests may be performed on 10-S-DRS-1, using crosslinking agent concentrations that may afford a metal to 3,4-dihydroxystyrene monomer ratio of approximately 0.66:1. For comparison, polystyrene (S-1) was may also be measured with these crosslinking agents.

Lap shear strength tests may be performed using, for example, aluminum adherends (e.g., 4"×1"×⅛") with a hole placed near one of the ends (e.g., ½" diameter). The adherends may be polished with, for example, a Craftsman 8" Polishing Wheel, first with Mibro #3 Cleaning & Polishing compound followed by Mibro #5 Cleaning and polishing compound. The adherends may be suspended by a glass bar in a beaker and washed in stirring hexanes for approximately 15 min., stirring acetone for approximately 15 min., stirring ethanol for approximately 15 min., and stirring water for approximately 15 min. The adherends may be dried overnight in air at room temperature.

After drying, the adherends may be placed on a plastic sheet. Four 15 µL aliquots of polymer solution (e.g., Ig polymer/mL acetone) may be placed within an approximately 1"×1" area at the end of one of the adherends. Two 15 µL aliquots of crosslinking agent (e.g., 1 M metal concentration in acetone) may be added to the adherend and mixed with a plastic pipette tip. Approximately 30 minutes after setting the samples, they may be placed in an incubator at ~55° C. for ~22 hrs. The shear strength of these samples may then be measured after a total set time of ~24 hrs. The measurements may be made, for example, using an Instron Materials Testing Instrument.

FIG. 6 illustrates exemplary results of these measurements as well as the exemplary standard reduction potentials of the crosslinking agent. For this exemplary figure, the ultimate shear strength was measured ten times for each sample and averaged. The use of a transition metal crosslinking agents may result in a greater increase in shear adhesive strength for polymers containing dihydroxystyrene than for just polystyrene. An increase in the standard reduction potential of the crosslinking agent may also results in an increase in the ultimate shear strength of the adhesive.

In this example, (TBA)$_2$Cr$_2$O$_7$ is the crosslinking agent that gave the highest ultimate shear strengths, therefore it may be used in further studies to optimize the ultimate shear strength of this adhesive system. When used as a crosslinking agent, (TBA)MnO$_4$ may afford ultimate shear strengths comparable to those observed with (TBA)$_2$Cr$_2$O$_7$. Solutions of (TBA)MnO$_4$ in acetone may have a tendency to react violently within 10 to 30 minutes of preparation.

Example 3

The following nonlimiting experiments illustrate the potential effect of polymer composition on ultimate sheer strength. This example is merely illustrative and does not limit the invention.

The effect of both 3,4-dihydroxystyrene percentage and amount of polymerization initiator on ultimate shear strength may be determined. For these tests, several changes may be made to the lap shear sample prep. A 50% dichloromethane/50% acetone mixture may be used as a solvent. The polymers may display reasonable solubility in this mixture. A smaller adhered area may be used. Some of the exemplary samples may exhibit ultimate shear strengths beyond the limit of the instrument employed in this experiment (2 kN) when using a ½"×½" overlap area.

A new method of mixing polymer and crosslinking solutions may be used that does not involve mechanical mixing with a pipette tip. Polymers with a high percentage of 3,4-dimethoxystyrene may react too quickly upon exposure to the crosslinking agent, possibly resulting in a large mass stuck to the pipette tip or a solid mass that prevents the two adherends from being adhered together.

Shear adhesive strength tests may be performed using aluminum adherends (e.g., 3"×½"×⅒") with a hole placed near one of the ends (e.g., ¼" diameter). The adherends may first be polished, for example, with a Craftsman 8" Polishing Wheel, first with Mibro #3 Cleaning & Polishing compound followed by Mibro #5 Cleaning and polishing compound. The adherends may be suspended by a glass bar in a beaker and washed, for example, in stirring hexanes for ~15 min., stirring acetone for ~15 min., stirring ethanol for ~15 min., and stirring water for ~15 min. The adherends may dry overnight in air at room temperature.

After drying the adherends, they may be laid next to each other on a plastic sheet. Approximately 22.5 µL of a polymer solution (e.g., 0.3 g polymer/1.0 mL solvent) may be spread over an area of ~0.5"×~0.5" at the end of each adherend. Approximately 15 µL of crosslinker solution may then be pipetted on top of the polymer solution on one of the adherends. The crosslinked adherend may be placed on top of the other adherend with an overlap area of approximately ½"×½".

In order to keep the adherends parallel, the back end of the top adherend may be supported with a ~⅒" thick sheet of aluminum. Approximately 30 minutes after setting the samples, they may be placed in an incubator at ~55° C. for 22 hrs. The shear strength of these samples may then be measured after a total set time of ~24 hrs. An Instron Materials Testing Instrument may be used to make these measurements at a speed of approximately 2.0 mm/min.

FIG. 7 shows exemplary average ultimate shear strengths of all polymers with a dichromate crosslinking agent (e.g., 0.33 Cr:DMS, 10 mg $(TBA)_2Cr_2O_7$ per adherend, and 20 mg $(TBA)_2Cr_2O_7$ per adherend). In this example, 20 mg was the maximum mass allowed by solubility in 15 µL of solvent.

The exemplary results in FIG. 7 are averages of at least 5 measurements In general, though not in all cases, the larger the ratio of monomer to initiator is, the stronger the resulting crosslinked adhesive may be. Shear strength may not be directly related to the percentage of 3,4-dihydroxystyrene. Shear strength may increase with the increase in dihydroxystyrene, for example, up to 10% 3,4dihydroxystyrene under the conditions of this example. Above 10% 3,4 dihydroxystyrene, shear strengths of the crosslinked adhesive may no longer increase with increasing dihydroxystyrene percentage under the conditions of this example. The adhesive systems that displayed the highest ultimate shear strengths under these conditions (FIG. 6) were 10-S-DHS-35 $(TBA)_2Cr_2O_7$ crosslinking agent.

Example 4

The following example illustrates the effect of cure time and temperature using an exemplary adhesive system. The example is merely illustrative and does not limit the invention as other systems and methods may be used within the scope of this invention.

Figure 8:
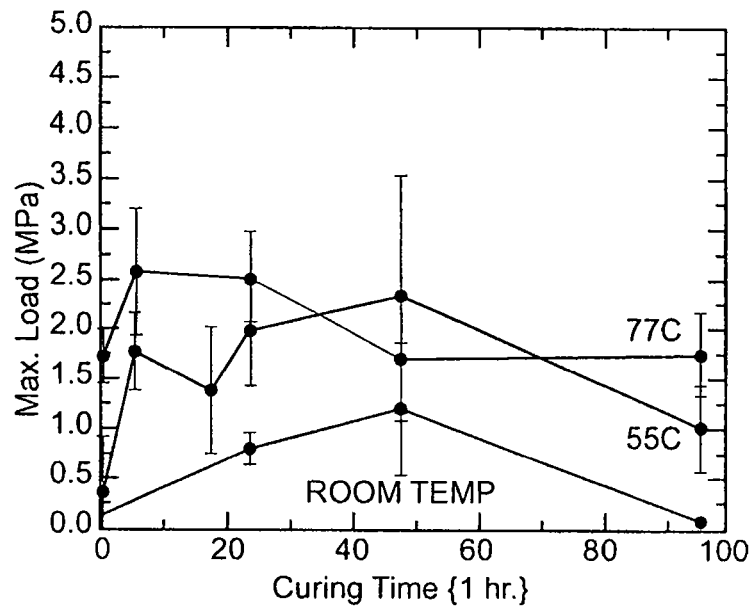
FIG. 8 illustrates exemplary average ultimate shear strength of 10-S-HDS-40 and a $(TBA)_2Cr_2O_7$ cross linking agent (Cr:DHS≈0.9) at different exemplary cure temperatures and times, under the conditions of Example 4.

The effect of cure time and temperature on this exemplary adhesive system may be determined using 10-S-HDS-40 and a $(TBA)_2Cr_2O_7$ crosslinking agent (e.g., Cr:DHS≈0.9). Shear measurements may be made as described in the previous section; but the temperature may be varied between, for example, room temp., 55° C., and 77° C. Cure times for each temperature may also be varied between, for example, 30 minutes and 96 hours. The results of this exemplary experiment are shown in FIG. 8. For example, at all exemplary cure temperatures, a maximum shear strength may be reached, but a decrease in shear strength may be observed after extensive curing. A room temperature cure may reach a maximum of ~1 MPa after 48 hrs. The highest ultimate shear strengths under these experimental conditions may be obtained by curing at approximately 55° C. from about 24 to about 48 hours or at approximately 77° C. from about 8 to about 24 hrs. Under these experimental conditions, curing at higher temperatures, up to about 100° C. may not result in significant increases in ultimate shear strength.

Example 5

The following example further illustrates how varying elements of the system, such as polymer concentration, may affect the properties of the polymers. The system was chosen for illustrative purposes only. The invention is not limited to the chosen system or conditions.

The effect of polymer concentration on ultimate shear strength may be tested with, for example, 10-S-HDS40 and a $(TBA)_2Cr_2O_7$ crosslinking agent (Cr:DHS≈0.9). Samples may be prepared as in Example 3. The volume of solvent may be kept constant for this experiment, but the mass of polymer may be varied, and the concentration of $(TBA)_2Cr_2O_7$ may be varied to keep Cr:DHS≈0.9.

Figure 9:
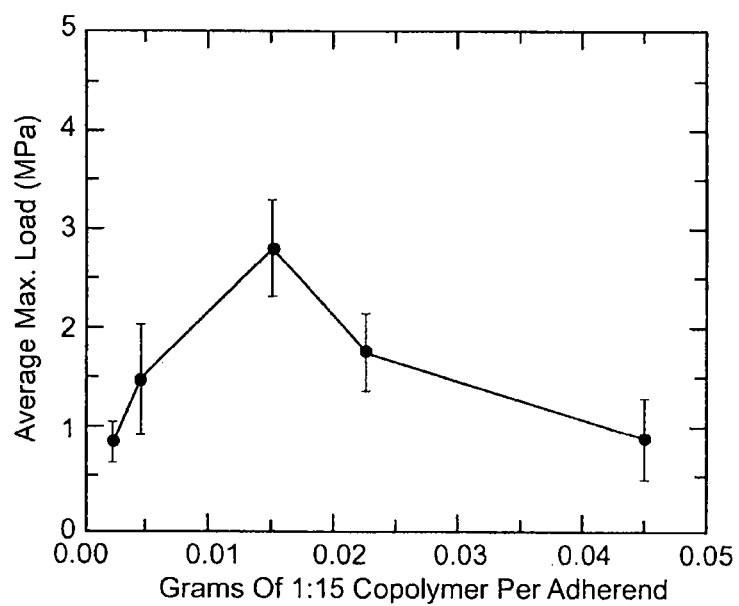
FIG. 9 illustrates exemplary ultimate shear strengths of 10-S-HDS-40 and $(TBA)_2Cr_2O_7$ cross linking agent (Cr: DHS≈0.9) at different exemplary polymer concentrations, under the conditions of Example 5.

FIG. 9 illustrates that, under these conditions, the mass of polymer per adherend that provided the highest ultimate shear strength may be about 0.0015 g/adherend.

Example 6

The following example further illustrates how varying elements of the system may affect the properties of the polymers. The system was chosen for illustrative purposes only. The invention is not limited to the chosen system or conditions.

The adhesive strength of 10-S-HDS-40 on a hydroxyapatite block (e.g., 1"×0.35"×0.25") using $(TBA)_2Cr_2O_7$ crosslinking agent (Cr:DHS≈0.33). The samples may be glued together with 22.5 µL polymer solution (e.g., 0.3 g 10-S-HDS-40/mL 50% dichloromethane/50% acetone) and approximately 7/5 µL of $(TBA)_2Cr_2O_7$ crosslinking solution (Cr:DHS≈0.33). An overlap area of, for example, approximately 0.35"×0.35" may be used. Under these experimental conditions, in all of the exemplary test samples the hydroxyapatite blocks may fracture and the glued regions may stay intact. Measurable ultimate shear strengths may be as high as approximately 2 MPa prior to adherend failure.

Example 7

The following example further illustrates how varying elements of the system, such as concentration of adhesive, may affect the properties of the polymers. The system was chosen for illustrative purposes only. The invention is not limited to the chosen system or conditions.

The effect of water exposure on adhesive strength may be tested on 10-S-HDS-55 with a Cr:DMS ratio of, for example, 0.45 using the testing method described above in Example 5.

For example, after curing at about 55° C. in air, the samples may display average ultimate shear strength of approximately 3.91+/−0.74 MPa. After curing, another set of samples may be exposed to boiling water for about two hours prior to measurement. These samples may display average ultimate shear strength of approximately 4.07+/−0.47 MPa. Under these experimental conditions, exposure of these samples to boiling water may not result in decreased adhesive strength of these adhesive systems.

Examples 8-15

Examples 8-15 which follow provide another exemplary polymer synthesis and characterization system. Other exemplary systems will be provided to illustrate the diversity of the system. These examples are not meant to be limiting, other systems are contemplated.

Example 8

For the present non-limiting example, all synthesis may be carried out under an argon atmosphere using, for example, standard Schlenk techniques. Gel permeation chromatography may be performed, for example, on a Waters gel permeation chromatography system with a refractive index detector (2414). Data may be collected on a personal computer using software, such as but not limited to, Breezel™ software. Differential scanning calorimetry may be performed on, for example, a TA Instruments 2920 modulated differential scanning calorimeter.

Monomer Purification. Styrene, which may be purchased from Sigma Aldrich, is inhibited may be inhibited with 10-15 ppm of 4-tert-butylcatechol. Column chromatography may be used to separate this inhibitor from the monomer. A 25 mL glass pipette may be cut at the tip and top to afford a functional column for monomer purification. The glass pipette may be oven dried for ~8 hr. prior to use. The column may be packed with, for example, about 0.6 cm of cotton, about 0.6 cm of oven dried sand, about 15-25 cm of oven-dried alumina, and about 0.6 cm of potassium carbonate. Styrene may be added, for example, to the top of the packed column and allowed to elute. It may be advantageous to purify the monomer less than about 12 hours before use and store the purified monomer at about 4° C. 3,4-Dimethoxystyrene, may be purchased from Sigma Aldrich, and may also contain an inhibitor, e.g., 1% hydroquinone. Column chromatography may be used to separate hydroquinone from the monomer in a manner analogous to that for styrene.

Polystyrene may be synthesized as follows. The preparation of polystyrene may be based on modification of literature procedures for the polymerization of vinyl monomers. (*J. Pol. Sci.: Pot. Symp.* 1986, 74, 227-242) Anhydrous toluene (235 mL) may be added by syringe to a degassed 500 mL Schlenk flask. The purified styrene (47 mL, 0.41 mol) may be added by syringe to the flask. Vacuum may be applied to the flask for 1 s and then back filled with argon. The flask may be placed into a dry ice/isopropanol bath, allowed to cool to ~−78° C. for 15 min., and ti-butyllithium (e.g., 1.34 mL, 2.6 M in hexanes) may be added dropwise by syringe. As n-butyllithium is added the solution may turn from colorless to yellow. The dry-ice/isopropanol bath may be removed, and the solution may warm to room temperature.

Upon warming the color of the solution may change from yellow to orange and then deep red. After ~20 h the reaction may be quenched by addition of methanol (e.g., 2 mL, 25° C.), affording a colorless solution. The reaction mixture may be vented and poured into a 1,000 mL round bottom flask containing ~500 mL of ice cold methanol. A cloudy white precipitate may form. A white solid may be obtained after solvent removal in vacuo (34.26 g, 82% yield). $^1$H NMR (CDCl3) δ 0.7-2.4 (e.g., broad, polymer backbone), 6.2-7.6 (e.g., broad, aromatic). Further exemplary characterization data are presented in FIG. 1.

Example 9

The following example further illustrates polymer synthesis. The system was chosen for illustrative purposes only. The invention is not limited to the chosen system or conditions.

Exemplary synthesis of Poly[(3,4-dimethoxystyrene)-co-styrene]. Poly[(3,4-dimethoxystyrene)-co-styrene], with varied percentages of 3,4-dimethoxystyrene and styrene, may be prepared by modification of the method described above in Example 8. The procedure described here is an exemplary polymerization of 1:1000 3,4-dimethoxystyrene:styrene poly [(3,4-dimethoxystyrene)-co-styrene]. Polymers containing about 1:5, 1:10, 1:15, and 1:50 ratios of 3,4-dimethoxystyrene:styrene may be prepared in a similar manner. Anhydrous toluene (e.g., 242 mL) may be added by syringe to a degassed 500 mL Schlenk flask and purified styrene (e.g., 47 mL, 0.41 mol) may be added by syringe. Purified 3,4 dimethoxystyrene (0.061 mL, 0.4 mmol) may be added to the flask by syringe.

Vacuum may be applied to the flask for 1 s and then the flask may be back filled with argon. The flask may be placed into a dry ice/isopropanol bath, and may be allowed to cool to ~−78° C. for 15 min. N-butyllithium (e.g., 1.34 mL, 2.6 M in hexanes) may be added drop-wise by syringe. As n-butyllithium is added the solution may turn from colorless to yellow to dark orange.

The reaction flask may be kept at ~−78° C. for at least about 8 hr. The solution may be allowed to gradually warm to room temperature. Warming may result in a color change, for example, from dark orange to light yellow. After 20 h the reaction may be quenched, for example, by addition of methanol (e.g., 2 mL, 25° C.), affording a colorless solution. The reaction mixture may be vented and poured into a 1,000 mL round bottom flask containing 500 mL of ice cold methanol. A cloudy white precipitate may form.

A white solid may be obtained after solvent removal in vacuo (e.g., 27.1.6 g, 64% yield). $^1$H NMR (CDCl3) δ 0.6-2.3 ppm (e.g., broad, polymer backbone), 3.4-3.8 ppm (e.g., broad, methoxy peaks), 6.0-7.4 ppm (e.g., broad, aromatic). FIG. 10 provides exemplary synthetic details and exemplary characterization data for each polymer.

Example 10

The following example further illustrates polymer synthesis. The system was chosen for illustrative purposes only. The invention is not limited to the chosen system or conditions.

Exemplary synthesis of Poly(3,4-dimethoxystyrene). Poly (3,4-dimethoxystyrene), may be prepared by modification of the method described above in Example 8. Anhydrous toluene (e.g., 45 mL) may be added by syringe to a degassed 250 mL Schlenk flask. The purified 3,4-dimethoxystyrene styrene (e.g., 6.0 mL, 0.041 mol) may be added by syringe.

Vacuum may be applied to the flask for about 1 s and then the flask may be back filled with argon. The flask may be placed into a dry ice/isopropanol bath, and may be allowed to cool to ~−78° C. for 15 min. N-butyllithium (e.g., 0.17 mL, 2.6 M in hexanes) may be added drop-wise by syringe. As n-butyllithium is added the solution may turn from colorless to yellow to dark orange.

The reaction flask may be kept at ~−78° C. for at least about 8 hr. The solution may be allowed to gradually warm to room temperature. Warming may result in a color change, for example, from dark orange to light yellow. After ~−20 h the reaction may be quenched, for example, by addition of methanol (e.g., 2 mL, 25° C.), affording a colorless solution. The reaction mixture may be vented and poured into a 500 mL round bottom flask containing 200 mL of ice cold methanol. A cloudy white precipitate may form.

A white solid may be obtained after solvent removal in vacuo (e.g., 5.8 g, 87% yield). $^1$H NMR (CDCl$_3$) δ 0.6-2.8 ppm (e.g., broad, polymer backbone), about 3.1-4.0 ppm (e.g., broad, methoxy peaks), about 5.5-7.1 ppm (e.g., broad, aromatic). FIG. 10 provides exemplary synthetic details and exemplary characterization data for each polymer.

Example 11

The following example further illustrates polymer synthesis. The system was chosen for illustrative purposes only. The invention is not limited to the chosen system or conditions.

Exemplary synthesis of poly[(3,4-dihydroxystyrene)-co-styrene]. The methoxy groups of each poly[(3,4-dimethoxystyrene)-co-styrene] copolymer may be removed according to standard methods to reveal the deprotected, catechol-containing polymers. (*Macromolecular Rapid Comm.* 1998, 19, 241-246; *J. Pol. Sci.: Pol. Symp.* 1986, 74, 227-242; *J. Org. Chem.* 1979, 44, 4444-4446).

The following is an exemplary procedure for deprotection of 1:1,000 poly[(3,4-dimethoxystyrene)-co-styrene].

Polymers containing, for example, 1:5, 1:10, 1:15, and 1:50 ratios of 3,4-dimethoxystyrene:styrene may be deprotected in a similar manner. poly[(3,4-dimethoxystyrene)-co-styrene] (e.g., 1:1000 copolymer) (e.g., 27.16 g) may be added to a 500 mL Schlenk flask under argon. Anhydrous dichloromethane (e.g., 100 mL) may be added to the flask by syringe, and the flask may be placed into an ice bath and allowed to cool for ~15 min. Boron tribromide (1.3 mL, 1 M in dichloromethane) may be added to the flask drop-wise by syringe. Upon addition of boron tribromide, the reaction mixture may become dark red. The flask may be left under a positive pressure of argon and may be allowed to gradually warm to room temperature.

After 18 hours, acidic water (e.g., 1,000 mL, 0.12 M HCl) may be added to a 2,000 mL Erlenmeyer flask equipped with a stir bar. The reaction mixture may be poured into the flask and a cloudy pink solution may form. The solution may be stirred at, for example, about 4° C. for about 15 min.

After the initial 15 min stirring the reaction mixture may be allowed to separate into organic and aqueous layers. The aqueous layer may be decanted into a filter flask. The organic layer may be washed with acidic water (e.g., 1,000 mL, 0.12 M HCl) for 15 min at 4° C. and the aqueous layer may be decanted into the filter flask. This washing step may be repeated approximately twice.

Dichloromethane (e.g., 300 mL) may be added to the resulting organic layer and the mixture may be transferred to a 2,000 mL separatory funnel. Fresh acidic water (e.g., 100 mL, 0.12 M HCl) may be added to the separatory funnel. The funnel may be capped, shaken, and allowed to separate into organic and aqueous layers for approximately 12 h.

A white solid may be obtained by solvent removal of the resulting organic layer in vacuo (e.g., 23.35 g, 86% yield). $^1$H NMR (CDCl$_3$) δ 0.3-2.7 ppm (e.g., broad, polymer backbone), 6.0-8.0 ppm (e.g., broad, aromatic). On average, under the conditions of this example, this procedure may afford about 98% and about 95% deprotection of the 1:10 and 1:5 polymers, respectively. Methoxy peaks (e.g., 3.1-4.9 ppm) may not be observable for polymers of higher styrene content. See FIG. 10 for further exemplary characterization.

Example 12

The following procedure is merely an illustrative exemplary synthesis of Poly(3,4-dihydroxystyrene). It is not meant to be limiting.

Poly(3,4-dihydroxystyrene) may be prepared by the deprotection of poly[(3,4-dimethoxystyrene)-co-styrene] with BBr$_3$. Poly(3,4-di methoxystyrene) (e.g., 5.5 g) may be added to a 250 mL Schlenk flask under argon. Anhydrous dichloromethane (e.g., 42 mL) may be added to the flask by syringe and the flask placed into an ice bath for 15 min. Boron tribromide (e.g., 10.5 mL) may be added to the flask dropwise by syringe. Upon addition of BBr$_3$, the reaction mixture may become cloudy and pink. The flask may be left under positive pressure argon flow and allowed to gradually warm to room temperature.

After 18 hours acidic water (e.g., 1,000 mL, 0.12 M HCl) may be added to a 2,000 mL Erlenmeyer flask equipped with a stir bar. The reaction mixture may be poured into the flask and a viscous, cloudy, dark pink solution may form. Additional dichloromethane (e.g., 300 mL) may be added to the solution, to decrease the viscosity. The solution may be stirred at 4° C. for 15 min.

The reaction mixture may then be allowed to separate into organic and aqueous layers. The aqueous layer may be decanted into a filter flask. The organic layer may be washed by addition of acidic water (e.g., 1,000 mL, 0.12 M HCl) for 15 min at 4° C., and the aqueous layer may be decanted into an Erlenmeyer flask. This washing step may be repeated twice more. Dichloromethane (e.g., 500 mL) may be added to the resultant organic layer and the mixture may be transferred, for example, to a 2,000 mL separatory funnel.

Fresh acidic water (e.g., 200 mL, 0.12 M HCl) may be added to the separatory funnel. The funnel may be capped, shaken, vented, and allowed to separate into organic and aqueous layers for approximately 12 h. A maroon solid may be obtained after solvent removal of the resultant organic layer in vacuo (e.g., 4.98 g, 90.5% yield). $^1$H NMR (CDCl$_3$) δ 0.7-2.4 (e.g., broad, polymer backbone), 6.3-7.4 (e.g., broad, aromatic). See FIG. 10 for further characterization.

Example 13

The following example is merely illustrative of exemplary solutions for penetration tests. This example is not limiting of the invention.

Reagent solutions may be prepared in order to test the crosslinking ability of, for example, various metal salts and oxidants. Metal salts and oxidants may be weighed out the day of testing, and solutions may be mixed, for example, 5-10 min prior to reaction with a polymer. Due to the hydrophobicity of the copolymers, all metal salt and oxidant solutions may be prepared in spectroscopy grade acetone, at a concentration of approximately 400 mM, with a final concentration after mixing with polymer of approximately 40 mM. Examples of the reagents that can be tested are found in FIG. 11.

Example 14

The following is a non-limiting example of exemplary penetration cross linking tests.

Samples may be prepared by dissolving, for example, 1.20±0.01 g of polymer in ~1.2 mL of acetone in a glass test tube. Each solution may be agitated, for example, on a minivortex machine for 30 sec and added to a plastic microcentrifuge tube (e.g., 2 mL volume, 9 mm i.d.×35 mm).

Three sample tests may be performed for each cross-linking agent per polymer and the data may be averaged. To each sample of polymer, ~0.4 mL of the appropriate cross-linker may be added by syringe and immediately stirred for 2-3 seconds with the syringe needle. Penetration tests may be performed at room temperature; about 60 min after samples were prepared.

The testing procedures employed may be adapted from Langmuir 2004, 20, 3724-3729, Chem. Comm. 2003, 1672-1673. An Instron 5544 Materials Testing Machine may be used to drive a steel rod into the cross-linked sample at a constant velocity. A 4.0 mm blank drill bit may penetrate the sample mixture at 20 mm/min. Sample microcentrifuge tubes may be secured in a drill chuck, specifically designed for the Instron instrument. For each run, the average total penetration depth may be 25-30 mm for each exemplary sample. A 100 N load cell may be used to monitor the resistive force of the sample against the rod, and data may be recorded every 0.5 mm using Merlin™ software on a personal computer. A sample with extensive cross-linking may generate a higher resistive force against penetration than one with limited cross-linking, and thus may require an increased force to lower the rod at a constant velocity.

Example 15

The following is a non-limiting illustrative example of adhesive shear testing. The illustration is not to be limited to the system employed in the example.

Lap-shear testing, for example, of the 1:10 feed ratio (e.g., 3.4:96.6 found) copolymer may be performed with, for example, an Instron materials testing machine. Polished aluminum adherends (e.g., about 10 cm×1.25 cm) may be used for these tests. For ease of handling, polymer and cross-linking agent concentrations may be diluted to ⅓ that of the concentration used for penetration testing. A ~22.5 µL aliquot of the polymer solution in 1:1 acetone:dichloromethane may be spread over a ~1.25×1.25 cm area on both adherends. An ~15 µL aliquot of cross-linking agent in 1:1 acetone:dichloromethane may be may be spread on top of the polymer solution on one adherend. The adherends may be overlapped with a ~1.25×1.25 cm area and may be cured in the same fashion as the penetration tests, for example, 1 h at room temperature, then 55° C. for about 22 hours, then cooled at room temperature for 1 hour.

For each test, 5 samples may be measured. Each sample may be loaded to failure at, for example, about 2 mm/min and the ultimate shear loads may be recorded and averaged. Under the instant experimental conditions, all samples may display cohesive failure.

Examples 16-18

Examples 16-18 provide experimental data characterizing an exemplary system of the disclosed bioinspired cross-linking polymers. The following data is merely illustrative and is not limiting of the disclosed system.

Example 16

The following description is illustrative only and not limiting. A family of poly[(3,4-dihydroxystyrene)-co-styrene] polymers may be synthesized with differing percentages of 3,4-dihydroxystyrene versus styrene, for example. Anionic polymerization may begin with 3,4-dihydroxystyrene: styrene monomer ratios of 1:1,000, 1:50, 1:15, 1:10, and 1:5. Subsequent deprotection with $BBr_3$ may yield poly[(3,4-dihydroxystyrene)-co-styrene] products.

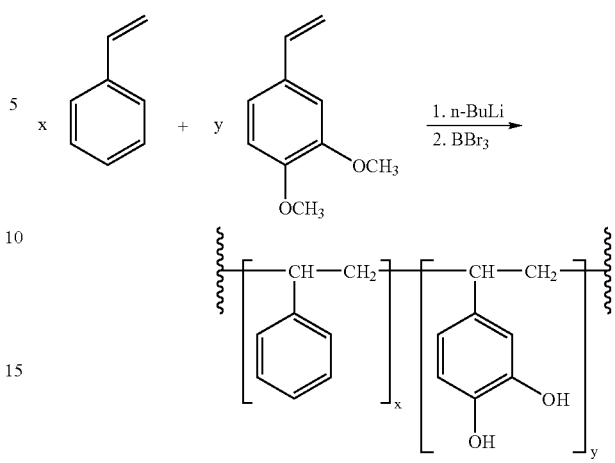

Glass transition temperatures of the protected polymers may be obtained by differential scanning calorimetry (DSC), or any other suitable method.

Under the particular conditions of this example, the following results may be obtained. These results are not limiting. 100% styrene may display a $T_g$=106.3° C. The 100% poly(3,4-dihydroxystyrene) may provide $T_g$=53.1° C. For copolymers containing both monomers, intermediate $T_g$ values may be obtained, such as $T_g$=90.6° C. for a 17% 3,4-dimethoxystyrene and about 87% styrene copolymer. The single, sharp thermal transitions found for each copolymer may indicate distribution of the two monomers throughout the chain, rather than formation of block copolymers.

Gel permeation chromatography (GPC), or any other suitable method, may used to determine the polymer number average molecular weight ($M_n$) and polydispersity indices (PDI). For example, the 1.3:98.7 3,4-dimethoxystyrene:styrene copolymer may display $M_n$=9,460 and PDI=1.38. Further data obtained may include: 4.1:95.9 copolymer, $M_n$=14,726, PDI=1.71; 3.4:96.6 copolymer, $M_n$=16,149, PDI=1.92; 12:88 copolymer, $M_n$=14,641, PDI=1.84. For the homopolymers prepared under identical conditions, longer chains lengths may be found (e.g., 100% styrene, $M_n$=126,000, PDI=1.26; 100% 3,4-dimethoxystyrene, $M_n$=43,894, PDI=1.37). Polymers may also be characterized by $^1$H NMR spectroscopy (see Examples 8-15 above).

Example 17

The following example illustrates cross linking reactions of exemplary bioinspired cross-linking polymers. The experimental results obtained under the disclosed conditions are illustrative and do not limit the breadth of the disclosure.

Crosslinking reactions may be explored, for example, by using an Instron 5544 materials testing system. An about 4.0 mm diameter rod may be driven into a viscous solution (e.g., 1 g polymer in 1 mL acetone) at constant velocity (20 mm/min), while the resistive penetration force may be recorded. High resistive forces may indicate a hardened composition while low forces may show a lack of curing.

Potential cross-linking agents may be reacted with these new polymers, which may include oxidizing metal ions such as $Fe^{III}(acac)_3$ where acac=acetylacetonate, $[(C_4H_9)_4N]Mn^{VII}O_4$, and $[(C_4H_9)_4N]_2(Cr^{VI}_2O_7)$, nonoxidizing metals ($Zn^{II}(NO_3)_2$, $Ga^{III}(NO_3)_3$, and $Co^{II}(NO_3)_2$), and nonmetallic oxidants (t-$C_4H_9OOH$, $[(C_4H_9)_4N]IO_4$), and $[(C_4H_9)_4N]_2SO_4$.

Figure 12:
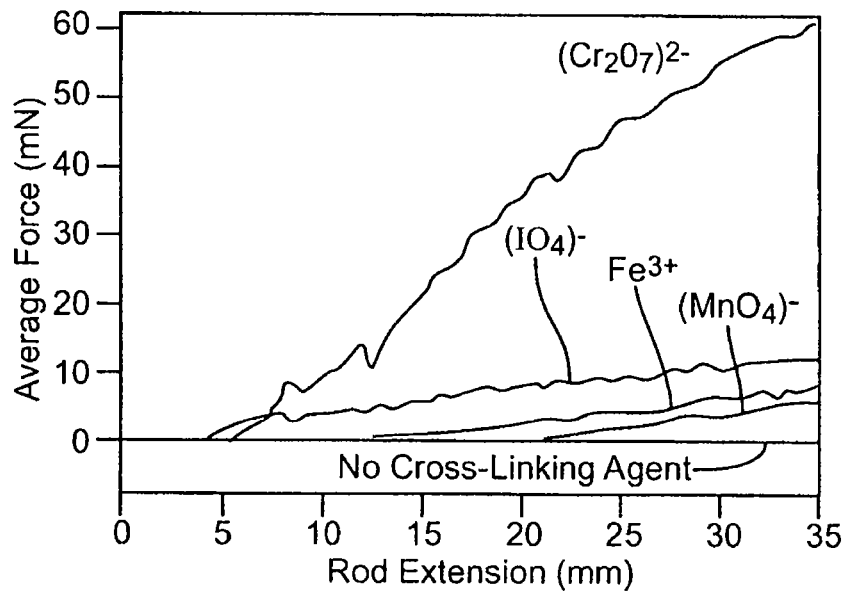
FIG. 12 shows exemplary curing data for the 1:10 3,4-dihydroxystyrene:styrene copolymer reacted with select cross-linkers, after a 1 hour cure at room temperature.

FIGS. 11 and 12 show exemplary curing and force data for the 3.4:96.6 3,4-dihydroxystyrene:styrene copolymer with select cross-linkers (40 mM final concentration), after a 1 hour cure at room temperature. The results are exemplary of those obtained under the present experimental conditions; results may vary with varied conditions.

Dichromate (($Cr_2O_7$)$^{2-}$) may display the highest penetration forces, thereby indicating the greatest amount of polymer cross-linking (61±6 N at 35 mm rod extension). ($IO_4$)$^-$ (12±0.6 N), $Fe^{3+}$ (7.9±0.5 N), and ($MnO_4$)$^-$ (5.4±0.5 N) may also show curing significantly greater than that obtained for the uncross-linked control sample (0.006±0.001 N).

For both the proteins and synthetic polymers, dichromate may prove to be the strongest inducer of hardening. Of the reagents available to mussels under natural conditions, $Fe^{3+}$ may promote hardening to the greatest degree for both the extracted protein and the synthetic polymers described here. Such cross-linking processes may be distinct from the condensation cross-linking found for ionomers. Simple metal ions such as $Na^+$ and $Zn^{2+}$ are often mixed with polycarboxylate polymers in order to impart hardness and adhesive properties. For the new polymers shown here, $Zn^{2+}$ addition promoted no hardening. Furthermore, hardening may be most pronounced with oxidizing ions such as $Fe^{3+}$ and ($IO_4$)$^-$. Thus metal-induced cross-linking in the poly[(3,4-dihydroxystyrene)-co-styrene] system likely occurs through a mechanism distinct from that of the ionomers.

Example 18

The following example illustrates characterization of the adhesive properties of exemplary bioinspired cross-linking polymers. The experimental results obtained under the disclosed conditions are illustrative and do not limit the breadth of the disclosure.

Figure 13:
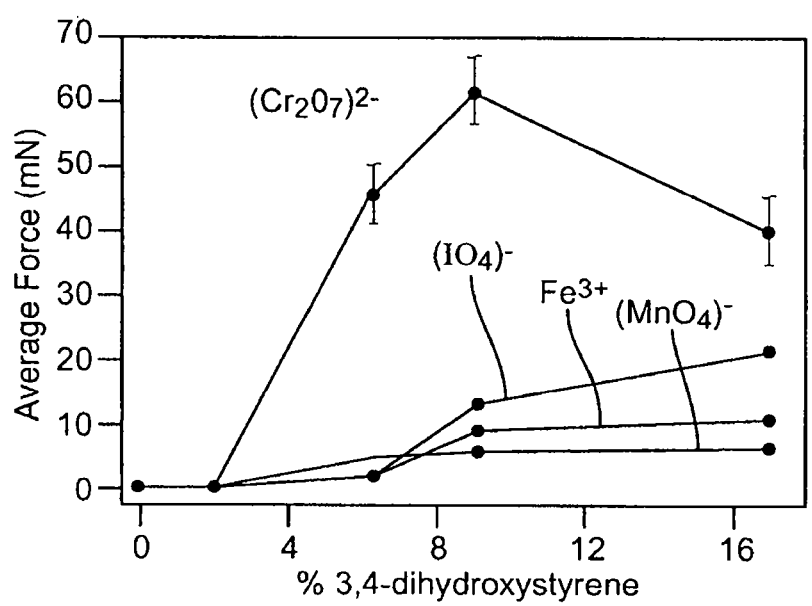
FIG. 13 shows exemplary penetration forces at 35 mm rod extension found for copolymers with varied percentages of 3,4-dihydroxystyrene distributed amongst styrene, under the conditions of Example 18.

The effects of polymer composition upon cross-linking may be examined in an exemplary system. FIG. 13 shows exemplary penetration forces at 35 mm rod extension found for copolymers with varied percentages of 3,4-dihydroxystyrene distributed amongst styrene, under the conditions of this experiment. As indicated, each polymer may be reacted with four reagents. Penetration tests may also be performed on about 100% poly(3,4-dihydroxystyrene), cross-linked by ($Cr_2O_7$)$^{2-}$ (75±3 N) and ($IO_4$)$^-$ (38±4 N). In general, higher percentages of 3,4-dihydroxystyrene in the polymer may bring about greater degrees of cross-linking. No cross-linking may be observed without catechol groups in the polymer chain.

To determine whether these new cross-linking polymers might exhibit appreciable adhesive properties the following exemplary experiments may be performed. The 3.4:96.6 3,4-dihydroxystyrene:styrene copolymer was chosen for lap shear tests, owing to significant curing (FIG. 1). The 100% polystyrene provided a control. Both a polymer (13.5 mg in 45 μL 1:1 acetone:dichloromethane) and a cross-linking agent (1:3 cross-linker:3,4-dihydroxystyrene monomer ratio, in 15 μL 1:1 acetone:dichloromethane) were combined between polished aluminum adherends with a 1.25×1.25 cm overlap area. After curing (24 h, 55° C.), the adherends were pulled apart in lap shear mode and the adhesive force at failure (in Newtons) was measured. Factoring in overlap area provided shear strength in Pascals (MPa=$10^6$ N/m$^2$). The exemplary data on the table in FIG. 14 indicate that cross-linking enhances the adhesive characteristics of the polymers.

Although differences in formulation, cure, and measurement conditions make direct comparisons difficult, the adhesive strength of a poly(lysine-DOPA) polypeptide of $M_n$≈255,000 has been reported at 4.3 MPa. Higher molecular weights enhance adhesion and a more appropriate comparison to our exemplary system with $M_n$ values in the range of ~9000-16,000 may be the poly(lysine-DOPA) of $M_n$=98,000 which adhered to 1.5 MPa.[26] The 3.4:96.6 poly[(3,4-dihydroxystyrene)-co-styrene] of $M_n$≈16,000 reported here may yield a comparable adhesive strength of approximately 1.2 MPa. A maximum force just over 1 MPa shows our first attempt at adhesive design to be stronger than starch-based glues (~0.4 MPa) and may be weaker than polyvinyl acetate "white" glues (~4 MPa).

While various embodiments of the invention have been described, it will be apparent to those of ordinary skill in the art that many more embodiments and implementations are possible that are within the scope of the invention.

Examples 19 and 20

The following example illustrates the adhesive properties of exemplary bioinspired cross-linking polymers comprising silver ions.

According to Example 12, a random copolymer of (styrene)-(3,4-dihydroxystyrene) of 10.1:1 monomer ratio was prepared. The polymer chain sizes were of molecular number Mn=24,995, molecular weight Mw=36,624, and polydispersity PDI=1.47. The polymer was cross-linked with silver nitrate ($AgNO_3$) at a ratio of 0.33:1 Ag:3,4-dihydroxystyrene.

According to Example 12, a random copolymer of (styrene)-(3,4-dihydroxystyrene) of 10.1:1 monomer ratio was prepared. The polymer chain sizes were of molecular number Mn=24,995, molecular weight Mw=36,624, and polydispersity PDI=1.47. The polymer was cross-linked with silver hexafluorophosphate ($AgPF_6$) at a ratio of 0.33:1 Ag:3,4-dihydroxystyrene.

Adhesion tests were carried out with polished aluminum adherends. Polymer was dissolved in $CH_2Cl_2$/DMF (1:1) and placed on each adherend. The silver salt ($AgNO_3$ or $AgPF_6$) was also dissolved and dropped onto the aluminum surface. The two solutions were mixed and then the two plates were overlapped with 2.5 cm×2.5 cm area. After curing at 55 C for 24 hours, the adhesion forces were tested to yield an average force of 1.6 (+/−0.6) MPa.

We claim:

1. A cross-linkable polymeric composition comprising:
   a polymer comprising at least two types of monomers, wherein at least one monomer is styrene and at least one monomer is a cross-linking group, wherein the at least one cross-linking group is 3,4-dihydroxystyrene;
   wherein the ratio of 3,4-dihydroxystyrene to styrene is from about 1:15 to about 1:5;
   wherein the polymer is a random polymer; and
   wherein the at least one cross-linking group is able to cross-link with a cross-linking agent to form a composition having adhesive properties.

2. The cross-linkable polymeric composition of claim 1, wherein another of the at least two types of monomers is selected from the group consisting of styrenesulfonate, ethylene, ethylene glycol, methylmethacrylate, acrylic acid, lactic acid and glycolic acid.

3. The cross-linkable polymeric composition of claim 1, wherein the polymer is poly[styrene-co-(3,4-dihydroxystyrene)].

4. The cross-linkable polymeric composition of claim 1, wherein the polymer is poly[styrene-co-dihydroxystyrene-co-styrenesulfonate].

5. The cross-linkable polymeric composition of claim 1, wherein the cross-linking group is protected by a protecting group.

6. The cross-linkable polymeric composition of claim 1, wherein the cross-linking agent is a metal or an oxidant.

7. The cross-linkable polymeric composition of claim 1, wherein the polymer further comprises a third monomer, the third monomer being

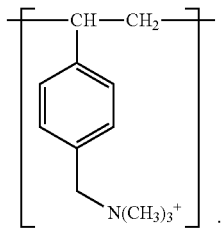

8. The cross-linkable polymeric composition of claim 1, wherein the polymer further comprises a third monomer, the third monomer being

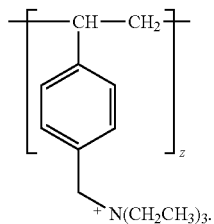

9. The cross-linkable polymeric composition of claim 1, wherein the polymer is able to cross-link with an oxidizing reagent to form a composition having adhesive properties.

10. The cross-linkable polymeric composition of claim 9, wherein the oxidizing reagent is selected from the group consisting of $[(C_4H_9)_4N]IO_4$, $Fe(acetonylacetonate)_3$, $[(C_4H_9)_4N](MnO_4)$, $Mn(OOCCH_3)_3$, $[(C_4H_9)_4N]_2(Cr_2O_7)$, $Na_3VO_4$ $[(C_4H_9)_4N]_3$, $V_3O_9$, and combinations thereof.

11. The cross-linkable polymeric composition of claim 10, wherein the oxidizing reagent is $[(C_4H_9)_4N](MnO_4)$.

12. The cross-linkable polymeric composition of claim 10, wherein the oxidizing reagent is $[(C_4H_9)_4N]_2 (Cr_2O_7)$.

13. The cross-linkable polymeric composition of claim 10, wherein the oxidizing reagent is $[(C_4H_9)_4N]_3V_3O_9$.

14. The cross-linkable polymeric composition of claim 10, wherein the oxidizing reagent is $[(C_4H_9)_4N]IO_4$.

* * * * *